(12) United States Patent
Casella

(10) Patent No.: US 11,045,057 B2
(45) Date of Patent: Jun. 29, 2021

(54) SUCTION CLEANER

(71) Applicant: TTI (Macao Commercial Offshore Limited), Avenida da Praia Grande (CN)

(72) Inventor: Jose Casella, Birmingham (GB)

(*) Notice: Subject to any disclaimer, the term of this patent is extended or adjusted under 35 U.S.C. 154(b) by 0 days.

(21) Appl. No.: 16/656,813

(22) Filed: Oct. 18, 2019

(65) Prior Publication Data
US 2020/0046189 A1 Feb. 13, 2020

Related U.S. Application Data

(63) Continuation of application No. PCT/GB2018/051001, filed on Apr. 17, 2018, and a
(Continued)

(30) Foreign Application Priority Data

Apr. 20, 2017 (GB) .................................... 1706294
Oct. 26, 2017 (GB) .................................... 1717581
(Continued)

(51) Int. Cl.
*B01D 50/00* (2006.01)
*A47L 9/16* (2006.01)
(Continued)

(52) U.S. Cl.
CPC ............. *A47L 9/1608* (2013.01); *A47L 9/165* (2013.01); *A47L 9/1633* (2013.01);
(Continued)

(58) Field of Classification Search
CPC .... A47L 9/1608; A47L 9/1633; A47L 9/1641; A47L 9/165; A47L 9/1666; A47L 9/1616;
(Continued)

(56) References Cited

U.S. PATENT DOCUMENTS 5,587,078 A 12/1996 Leblanc
7,169,201 B2 * 1/2007 Oh ..................... A47L 9/1625
15/350

(Continued)

FOREIGN PATENT DOCUMENTS

CN 2250201 Y 3/1997
CN 2768901 Y 4/2006
(Continued)

OTHER PUBLICATIONS

Elsayed, "Analysis and Optimization of Cyclone Separators Geometry using RANS and LES methodologies", Thesis Submitted to Vrije Universiteit Brussels Department of Mechanical Engineering, <http://mech.vub.ac.be/thermodynamics/phd/PhD_thesis_Khairy_Elsayed.pdf>, Oct. 2011, 317 pages.
(Continued)

*Primary Examiner* — Dung H Bui
(74) *Attorney, Agent, or Firm* — Michael Best & Friedrich LLP

(57) ABSTRACT

A separator assembly including a first cyclone, a second cyclone, and a sealing plate. The second cyclone assembly includes a plurality of second cyclone separators arranged fluidly in parallel. At least a portion of the plurality of second cyclone separators is arranged in a ring of cyclones spaced radially from an axis and connected by wall portions. The sealing plate surrounds a portion of each of the second cyclone separators, configured such that each of the second cyclone separators extends through a respective opening defined in the sealing plate. A flow path is defined between the first cyclone separator to the inlets of the second cyclone separators, at least a portion of the flow path being bounded by at least a portion of an upper surface of the sealing plate and the wall portions.

18 Claims, 15 Drawing Sheets

Related U.S. Application Data continuation of application No. PCT/GB2018/051002, filed on Apr. 17, 2018, and a continuation of application No. PCT/GB2018/051003, filed on Apr. 17, 2018, and a continuation of application No. PCT/GB2018/051004, filed on Apr. 17, 2018, and a continuation of application No. PCT/GB2018/051005, filed on Apr. 17, 2018, and a continuation of application No. PCT/GB2018/051006, filed on Apr. 17, 2018.

(30) Foreign Application Priority Data

| Oct. 26, 2017 | (GB) | 1717584 |
|---|---|---|
| Oct. 26, 2017 | (GB) | 1717585 |
| Oct. 26, 2017 | (GB) | 1717586 |
| Oct. 26, 2017 | (GB) | 1717587 |

(51) Int. Cl.

| B01D 45/16 | (2006.01) |
|---|---|
| B04C 5/14 | (2006.01) |
| B04C 5/26 | (2006.01) |
| B04C 5/28 | (2006.01) |
| B04C 9/00 | (2006.01) |

(52) U.S. Cl.

CPC ......... *A47L 9/1641* (2013.01); *A47L 9/1666* (2013.01); *B01D 45/16* (2013.01); *B01D 50/002* (2013.01); *B04C 5/14* (2013.01); *B04C 5/26* (2013.01); *B04C 5/28* (2013.01); *B04C 9/00* (2013.01); *B04C 2009/004* (2013.01)

(58) Field of Classification Search

CPC ........ A47L 9/1658; A47L 9/1625; A47L 9/16; A47L 9/1683; B01D 45/16; B01D 50/002; B04C 5/14; B04C 5/26; B04C 5/28; B04C 9/00; B04C 2009/004; B04C 5/12; B04C 5/185; B04C 5/13

See application file for complete search history.

(56) References Cited

U.S. PATENT DOCUMENTS

| 7,744,667 | B2* | 6/2010 | Oh | A47L 9/1683 |
|---|---|---|---|---|
| | | | | 55/343 |
| 8,152,878 | B2* | 4/2012 | McLeod | B04C 5/26 |
| | | | | 55/343 |
| 2005/0138757 | A1 | 6/2005 | Lee | |
| 2006/0168923 | A1* | 8/2006 | Lee | A47L 9/1641 |
| | | | | 55/345 |
| 2006/0230718 | A1* | 10/2006 | Han | A47L 9/1641 |
| | | | | 55/345 |
| 2006/0254226 | A1* | 11/2006 | Jeon | B04C 5/02 |
| | | | | 55/345 |
| 2006/0286499 | A1* | 12/2006 | Kim | A47L 9/1625 |
| | | | | 432/106 |
| 2008/0184681 | A1 | 8/2008 | Oh et al. | |
| 2010/0213118 | A1* | 8/2010 | Tandon | B04C 5/185 |
| | | | | 210/512.2 |
| 2011/0209447 | A1* | 9/2011 | Worker | B04C 5/13 |
| | | | | 55/347 |
| 2013/0091812 | A1 | 4/2013 | Smith | |
| 2013/0291334 | A1* | 11/2013 | Peng | A47L 9/165 |
| | | | | 15/353 |
| 2014/0196248 | A1* | 7/2014 | Morgan | A47L 9/1683 |
| | | | | 15/353 |
| 2014/0223871 | A1 | 8/2014 | Makarov | |
| 2016/0206167 | A1* | 7/2016 | Kim | A47L 9/1633 |
| 2018/0000304 | A1* | 1/2018 | Zhong | B04C 5/26 |
| 2019/0014961 | A1* | 1/2019 | Hyun | A47L 9/1691 |

FOREIGN PATENT DOCUMENTS

| CN | 203468514 U | 3/2014 |
|---|---|---|
| DE | 202004020612 U | 9/2005 |
| GB | 2381223 A | 4/2003 |
| GB | 2468150 A | 9/2010 |
| GB | 2524018 A | 9/2015 |
| GB | 2541677 A | 3/2017 |
| WO | 2017171501 A1 | 10/2017 |
| WO | 2017179927 A1 | 10/2017 |
| WO | 2017191983 A1 | 11/2017 |

OTHER PUBLICATIONS

El-Batsh, "Improving cyclone performance by proper selection of the exit pipe", Applied Mathematical Modelling, vol. 37, pp. 5286-5303, 2013.

Intellectual Property Office of the United Kingdom Search Report for Application No. GB1706294 dated Aug. 22, 2017 (3 pages).

Intellectual Property Office of the United Kingdom Search Report for Application No. GB1717587.8 dated Apr. 4, 2018 (4 pages).

Intellectual Property Office of the United Kingdom Search Report for Application No. GB1717584.5 dated Mar. 26, 2018 (4 pages).

Intellectual Property Office of the United Kingdom Search Report for Application No. GB1717586 dated Mar. 26, 2018 (4 pages).

Intellectual Property Office of the United Kingdom Search Report for Application No. GB1717581.1 dated Mar. 26, 2018 (3 pages).

Intellectual Property Office of the United Kingdom Search Report for Application No. GB1717585.2 dated Apr. 4, 2018 (3 pages).

* cited by examiner

SUCTION CLEANER

CROSS-REFERENCE TO RELATED APPLICATIONS

This application is a continuation of International Application Nos. PCT/GB2018/051001, PCT/GB2018/051002, PCT/GB2018/051003, PCT/GB2018/051004, PCT/GB2018/051005, and PCT/GB2018/051006, all of which were filed on Apr. 17, 2018. PCT/GB2018/051001 claims priority to GB1706294.4, filed Apr. 20, 2017. PCT/GB2018/051002 claims priority to GB1706294.4, filed Apr. 20, 2017, and GB1717581.1, filed Oct. 26, 2017. PCT/GB2018/051003 claims priority to GB1706294.4, filed Apr. 20, 2017, and GB1717584.5, filed Oct. 26, 2017. PCT/GB2018/051004 claims priority to GB1706294.4, filed Apr. 20, 2017, and GB1717585.2, filed Oct. 26, 2017. PCT/GB2018/051005 claims priority to GB1706294.4, filed Apr. 20, 2017, and GB1717586.0, filed Oct. 26, 2017. PCT/GB2018/051006 claims priority to GB1706294.4, filed Apr. 20, 2017, and GB1717587.8, filed Oct. 26, 2017. The entire contents of these international applications and GB priority applications are hereby incorporated by reference herein.

SUMMARY

The present invention relates to a suction cleaner, and in particular to a suction cleaner of the type that provides a cyclonic separator.

In general terms, a cyclonic separator supplies a high speed rotating airflow into a generally cylindrical chamber. The airflow is typically supplied at a tangent to a central axis of the chamber. The chamber may be conical, as an alternative to being cylindrical, or may be part-cylindrical (an upper part, for example) and part-conical (towards a lower end).

The air flow within the chamber forms a helical flow path. The flow path may form around a vortex-finder located centrally at the upper end of the chamber, or around a central shroud, through either of which the cleaned air flow is drawn to exit the chamber. Such a shroud may be located at or towards the upper (and, in embodiments, wider) end of the cyclone chamber.

A portion of dirt in the air stream is deposited from the air flow as it swirls around the cyclone chamber—either simply falling down to the base of the chamber, where it sits and gathers in a dirt collection volume formed at the base, or radially outwardly through an aperture formed in the wall of the chamber (a so-called 'throw-off' or 'over-the-wall' style separator), into a dirt collection volume surrounding the chamber.

Where a cyclone separator includes a filter provided by a shroud, a mesh or a slotted screen, the filter is typically formed around all or a part of an outer perimeter of the shroud. The filter removes dirt particles larger than a certain size from the air flow passing through the shroud, depending on the size of the apertures. A portion of the dirt retained in the swirling air flow is removed from the air flow as it passes through the mesh or slots formed at the shroud, which subsequently falls towards the base of the chamber (or a portion of which may be held by the suction force, at least momentarily, applied to the shroud).

A cyclone chamber may alternatively provide a vortex finder, forming the cyclone outlet, as mentioned above. In such embodiments, the air flow swirling around the chamber exits the chamber in an almost straight stream from a lower part of the chamber, upwards through the centre of the cyclone, leaving the chamber via the vortex finder. In such embodiments, larger particles of dirt generally have an inertia that is too great to be drawn upwards with the airflow from the bottom of the chamber, and therefore the dirt falls to and collects at the bottom of the chamber.

According to an aspect of the invention we provide a separator assembly for removing dirt from an air flow in a suction cleaner, the separator assembly including: a first cyclone assembly including a first cyclone separator for separating coarse dirt from an air flow, the separator assembly including a filter for blocking the passage of coarse dirt from the first cyclone separator, and a second cyclone assembly including a plurality of second cyclone separators arranged fluidly in parallel for separating fine dirt from an air flow, each providing a body with a cyclone inlet towards an upper end and a dirt outlet formed at a lower end; and a sealing plate that surrounds a portion of each of the second cyclone separators, configured such that each of the second cyclone separators extends through a respective opening defined in the sealing plate so that the dirt outlets of the second cyclone separators lie below the sealing plate and the cyclone inlets lie above the sealing plate, wherein a flow path is defined between the filter of the first cyclone separator through which air is drawn from the first cyclone separator, to the inlets of the second cyclone separators, at least a portion of the flow path being bounded by at least a portion of an upper surface of the sealing plate.

Further aspects of the above embodiments of the invention are set out in the appended claim set.

DETAILED DESCRIPTION

Figure 1:
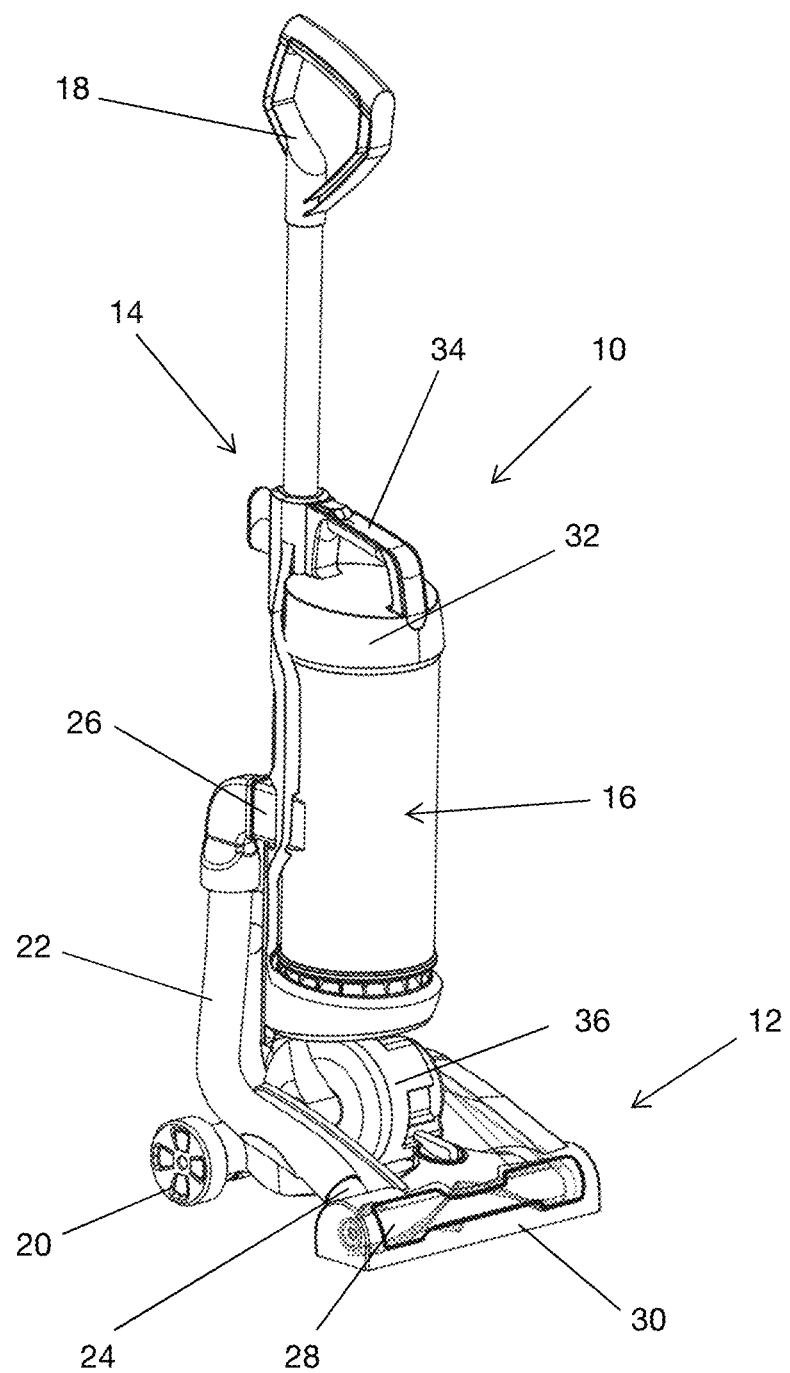
FIG. 1 is a perspective view of a suction cleaner according to embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

With reference to the drawings, we provide a suction cleaner 10 for cleaning a surface. In general terms, and with reference to FIGS. 1 and 2 in particular, the suction cleaner 10 comprises an upright body 14 providing a user-graspable handle 18, to allow a user to move and steer the device. The suction cleaner 10 provides a floor head 12 defining a suction mouth 30 for applying a suction force to a surface being cleaned, the suction force being generated by a motor 36 disposed fluidly downstream of the suction mouth 30. The floor head 12 provides rollers 20 (e.g. wheels) for moving the suction cleaner 10 across a surface.

In embodiments, and as shown, the suction cleaner 10 may be of the type generally known as an 'upright' cleaner, in which the upright body 14 is pivotally connected to the floor head 12. Such cleaners are typically used to clean a floor surface. In other embodiments, the suction cleaner 10 may be of a canister type in which a separate handheld wand provides the suction mouth, and is connected to the body of the cleaner via a suction hose or the like, or a handheld type cleaner in which the motor, suction mouth, and handle are all provided in a compact handheld unit. For simplicity, features of various embodiments will be described in the context of an upright cleaner, but it should be understood that the features described herein are applicable to any existing types of cleaner, unless otherwise stated, and for cleaners configured to clean any type of surface.

In more detail, the floor head 12 provides an agitator 28 for dislodging dirt from a surface being cleaned, and a floor head outlet 24 from which air and entrained dirt are drawn from the floor head towards a separator assembly 16 via a suction passage 22. The floor head 12 provides a ground-engaging assembly, such as a pair of wheels 20, to allow the suction cleaner 10 to be moved over a surface.

The suction cleaner 10 provides a support structure 38 on which a separator assembly 16 is supported. The suction passage 22 fluidly connects the floor head 12 to the inlet 26 of the separator assembly 16. An outlet 80 (not shown in FIGS. 1 and 2) of the separator assembly 16 fluidly connects the separator assembly 16 to the motor 36, via which a suction air flow is generated within the suction cleaner, so as to draw air and entrained dirt through the floor head 12, to the separator assembly 16, and to draw cleaned air from the separator assembly 16. An exhaust outlet 37 vents air from the suction device 10, downstream of the motor 36.

Figure 2:
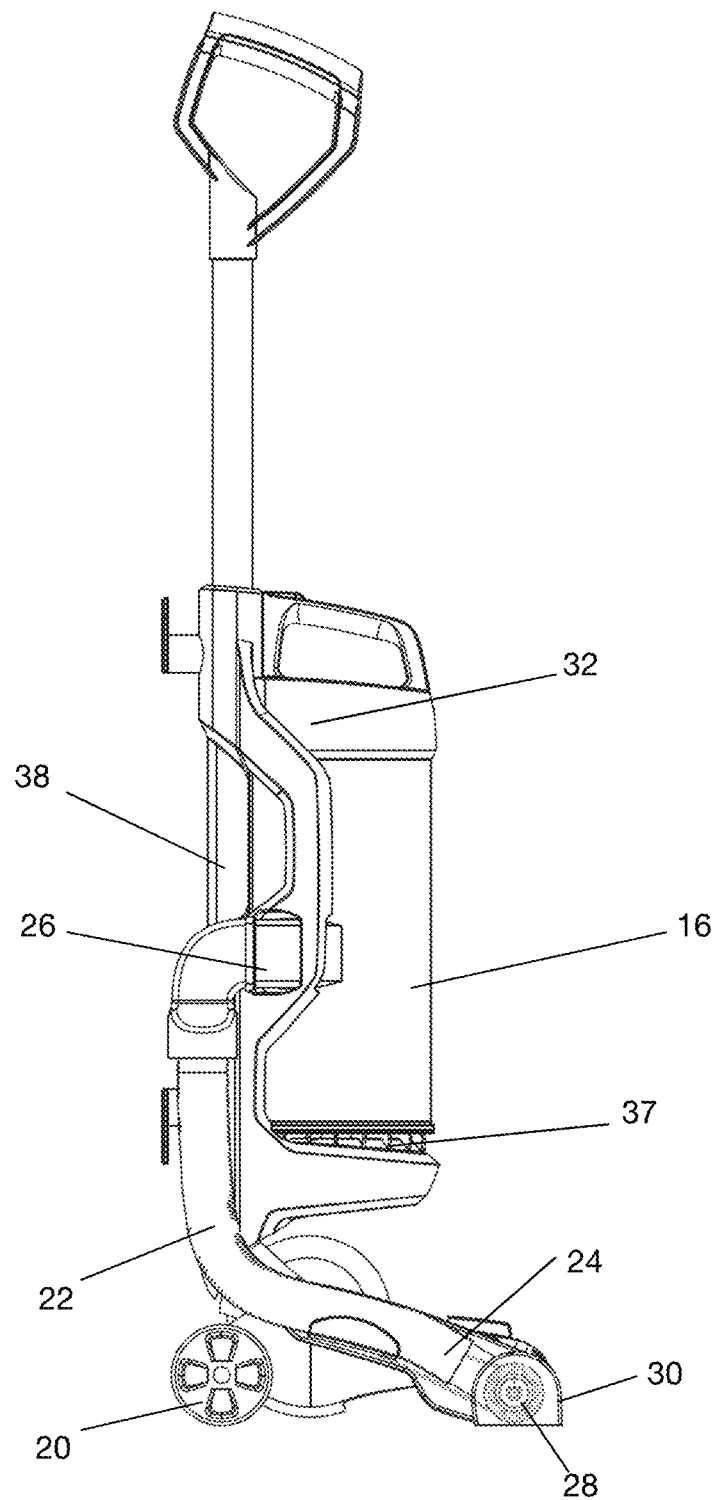
FIG. 2 is a side view of the suction cleaner of FIG. 1.

In embodiments, and as shown in FIGS. 1 and 2, the separator assembly 16 may be mounted on a portion of the support structure 38 in use, but may be detachable from the support structure 38 for the purpose of emptying. The separator assembly may be formed within a canister, have a lid 32 that is releasable or moveable from at least one end of the canister, to allow contained dirt to be emptied from the canister. A lid handle 34 may be provided on the lid 32, to allow a user to lift away the canister.

Figure 3:
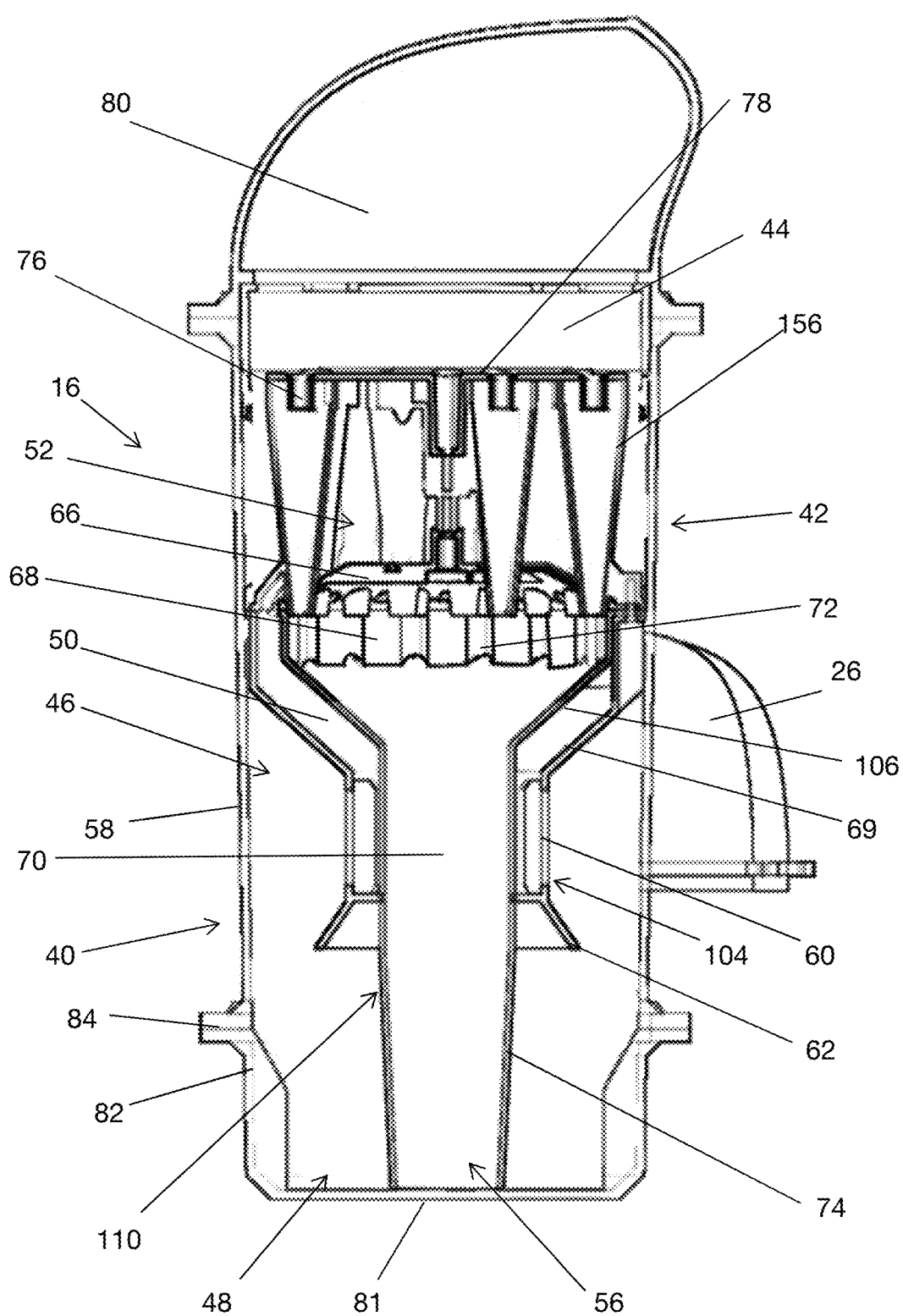
FIG. 3 is a side cross-sectional view of a separator assembly according to embodiments of the invention.

In embodiments, and as shown in FIG. 3 for example, a canister housing the separator assembly may be formed with a removable portion. The example canister shown in FIG. 3 provides a removable lower portion 82, that is connected to the main portion or upper portion of the canister via bolts, latches, hinges, or the like, formed between adjacent parts of rims 84 formed on the adjacent portions of the canister. In this way, the lower portion 82 of the canister may be hinged open, or removed, to allow dirt to be emptied from the canister.

In other embodiments, the motor 36 may be detachable from the body and support structure of the suction cleaner 10 together with the separator assembly 16, to provide a hand-held cleaning device separate from the floor-standing components of the cleaner.

In embodiments, the motor 36 is supported on the floor head 12. In other embodiments, the motor 36 is supported on the upright body 14, and may be housed with the separator assembly 16.

In embodiments, the suction passage 22 may be disconnected from the floor head 12 or from the separator assembly 16. The or another suction passage 22 (such as a separate suction hose, for example) may be connected to the separator assembly 16 at one end and to a wand-mounted cleaning head or cleaning tool at its other end, to allow a user to clean using a suction mouth provided on the wand-mounted cleaning head or suction tool, for example.

According to the invention, the separator assembly 16 includes a first cyclone assembly 40 including a first cyclone separator for separating coarse dirt from an air flow, the separator including a filter or screen 85 for blocking the passage of coarse dirt from the first cyclone separator. The separator assembly 16 further includes a second cyclone assembly 42 including a plurality of second cyclone separators 156 arranged fluidly in parallel for separating fine dirt from an air flow, each providing a body 176a, 176b, with a cyclone inlet 160a, 160b towards an upper end and a dirt outlet 172a, 172b formed at a lower end. The separator assembly 16 includes a lower sealing plate 66 that surrounds a portion of each of the second cyclone separators 156, configured such that each of the second cyclone separators 156 extends through a respective opening 130, 132 defined in the sealing plate 66 so that the dirt outlets 172a, 172b of the second cyclone separators 156 lie below the sealing plate 66, and the cyclone inlets 160a, 160b lie above the sealing plate 66. A flow path 50 is defined between the filter or screen 85 of the first cyclone separator 40 through which air is drawn from the first cyclone separator 40, to the inlets 160a, 160b of the second cyclone separators 156, at least a portion of the flow path 50 being bounded by at least a portion of an upper surface 136 of the sealing plate 66.

This configuration provides a compact layout, wherein the lower sealing plate 66 not only defines an end wall of a dirt bin for receiving dirt from the second cyclone assembly 42, but defines a portion of the flow path 50 leading between the first and second cyclone assemblies 40, 42. This layout and other associated features are described in more detail below.

In general terms, and with reference to FIG. 3, the separator assembly 16 includes a first cyclone assembly 40 including a first cyclone separator for separating coarse dirt from an air flow, and a second cyclone assembly 42 including a plurality of second cyclone separators 156 arranged fluidly in parallel for separating fine dirt from an air flow. Each second cyclone separator provides a body 176, 176a, 176b with a cyclone inlet 160a, 160b towards an upper end 88 and a dirt outlet 172a, 172b formed at a lower end.

A first dirt collector 48 is provided, for receiving dirt separated from an air flow in the first cyclone assembly 40. The dirt separated from the air flowing through the first cyclone separator falls downwards through the separation chamber 46, to a dirt collector region 48 defined at the lowermost end of the chamber 46. The suction cleaner 10 further includes a second dirt collector 110, for receiving dirt separated from an air flow in the second cyclone assembly 42.

Describing the first cyclone assembly 40 in more detail, the air flow with entrained dirt enters the separation chamber 46 of the first cyclone assembly 40 via the separator assembly inlet 26. The separation chamber 46 is formed within a generally cylindrical wall 58. A shroud structure 104 is provided, configured such that air entering the chamber 46 is caused to swirl around the shroud, the shroud structure 104 including a plurality of struts 60 spaced about a central axis, and defining a plurality of openings 86 between adjacent pairs of the struts 60. In embodiments, the shroud structure 104 is located centrally within the chamber 46, so that air within the chamber 46 swirls around the shroud structure 104, and dirt is forced outwardly and downwardly from the air flow. One or more lateral strips 98 is provided, disposed between adjacent pairs of struts 60, to provide reinforcement to the shroud structure 104 and support the struts 60 in position.

Figure 4:
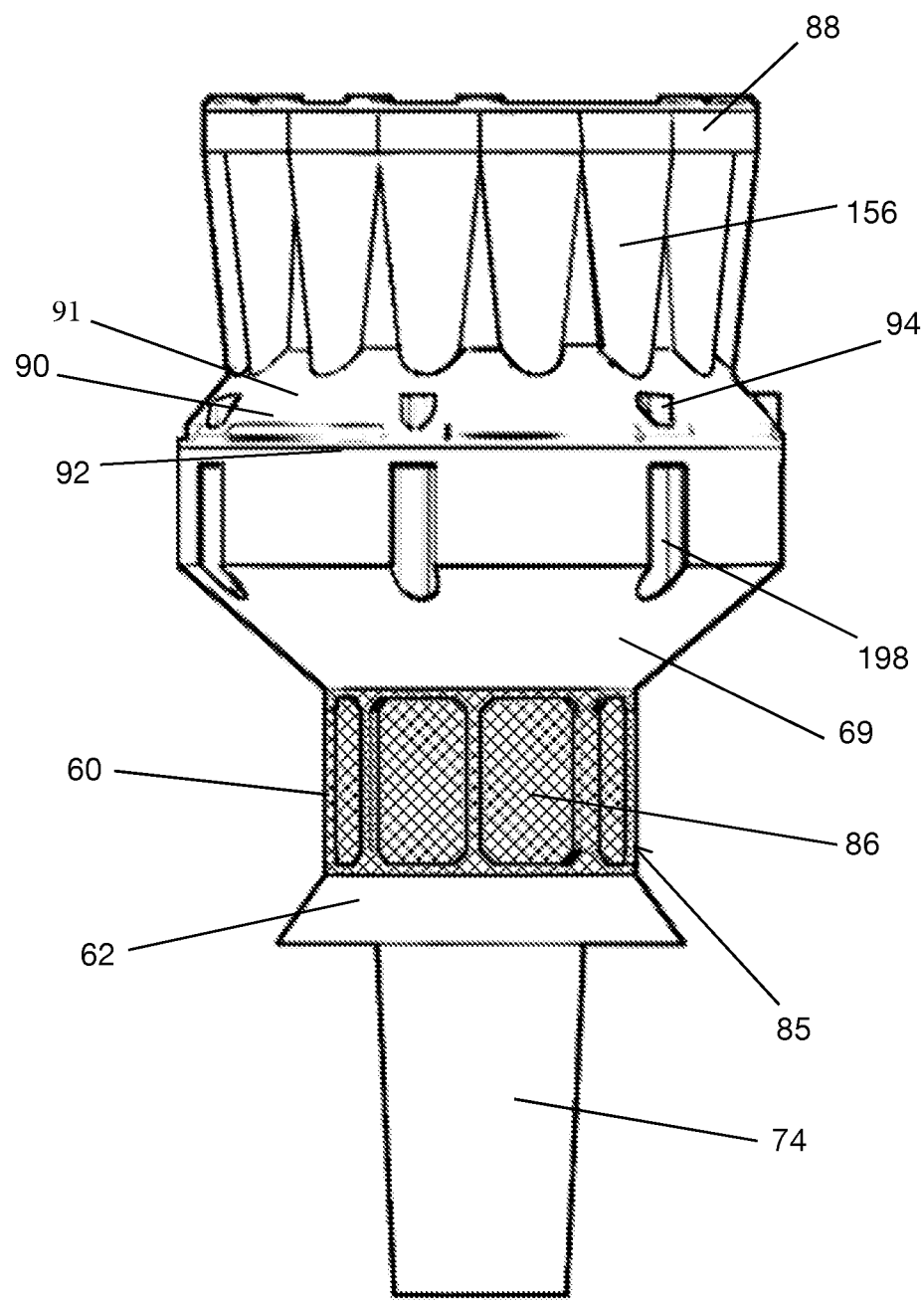
FIG. 4 is a front view of a portion of a two-stage separator assembly.

As shown in FIG. 4, a screen 85 providing a plurality of apertures is disposed across one or more of the openings of the shroud structure 104, for blocking the passage of coarse dirt through the shroud structure 104. The first cyclone assembly 40 provides an outlet for fluid connection to a source of suction 36, downstream of the shroud structure 104, through which air is drawn from the separation chamber 46. In embodiments having a second cyclone assembly, down-stream of the first, the outlet of the first cyclone assembly 40 provides an air flow path that leads from the shroud structure 104 to the inlet or inlets of the second stage cyclone separator(s) 156.

Figure 5:
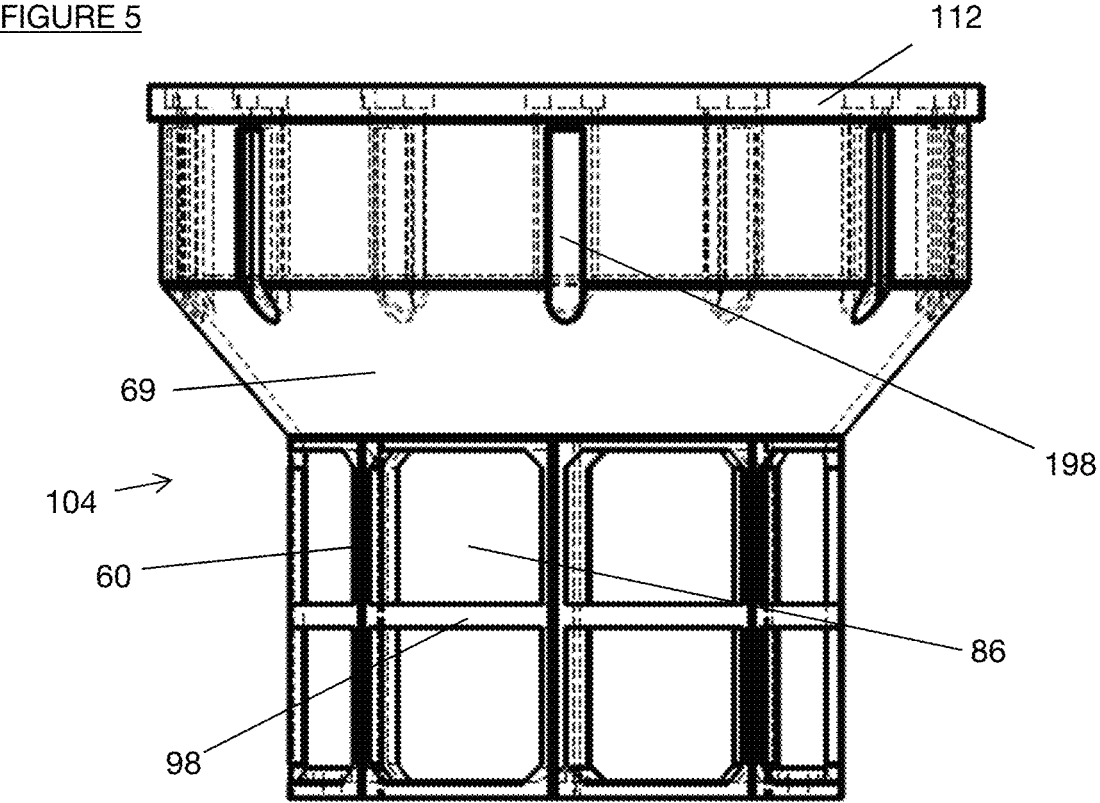
FIG. 5 is a front view of a portion of a separator assembly including a shroud.
Figure 6:
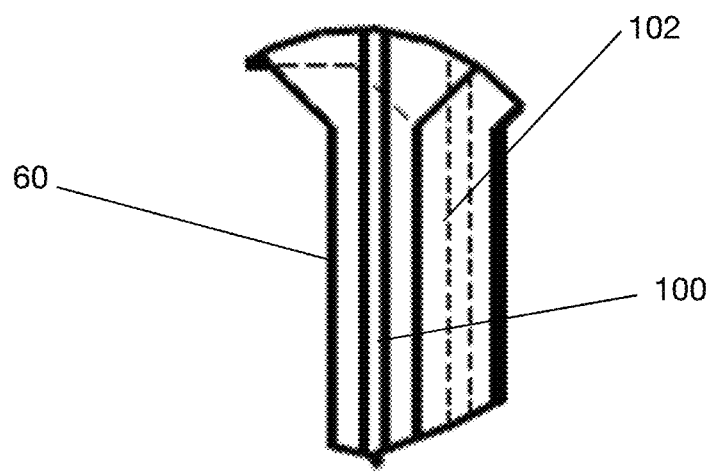
FIG. 6 is a perspective view of a portion of a strut of a shroud of a separator assembly according to embodiments of the invention.

In embodiments, and as illustrated in FIGS. 5 and 6 of the drawings, at least one of the struts 60 of the shroud structure 104 defines a recess 100 in which an adhesive is provided. The recess is formed in the direction of the depth 102 of the or each strut 60 (i.e. in the direction radially from the central axis). In such embodiments, a portion of the screen 85 is attached to one or more of the struts 60 by the adhesive.

It is known to attach a screen to a strut using an adhesive, but difficulty has previously been encountered in ensuring that the screen is securely held to the struts, due to the relatively small contact surface area provided by the struts. The wider the struts are, the smaller the openings between adjacent struts through which air flows, and the greater the turbulence created by the struts to the air swirling around and through the screen of the shroud structure.

By providing an indentation, channel or recess 100, into which adhesive can be deployed prior to the attachment of the screen to the struts 60, a greater contact area can be made than was previously possible, since the entire open face of the recess 100 can be filled with adhesive that is then directly in contact with the inner face of the screen 85 once it is attached.

The recess 100 in the one or more struts 60 of the shroud is preferably formed as a recessed channel running lengthwise of the strut 60 (i.e. the height of the strut, in the embodiments shown). The width of the recess 100 (i.e. in the direction generally perpendicular to the length of the strut 60) is in the range of 0.5 mm to 4 mm, and preferably in the range of 1 mm-2 mm. The depth of the recess 100 (i.e. in the direction aligned radially outward from the central axis) is between 0.05 mm and 4 mm, and preferably in the range of 1 mm-2 mm. In embodiments, portions of the screen 85 are attached to each of the struts 60 of the shroud, as the screen 85 is wrapped around the outside of the shroud structure 104.

In embodiments, the screen 85 is a perforated plate or mesh screen, which may provide a plurality of elongate slots, the slots running either horizontally, vertically, or diagonally. In embodiments, the shroud structure 104 and the screen 85 are constructed of plastic. Alternatively, the screen 85 may be formed of fine metal, gauze, or the like.

Figure 7:
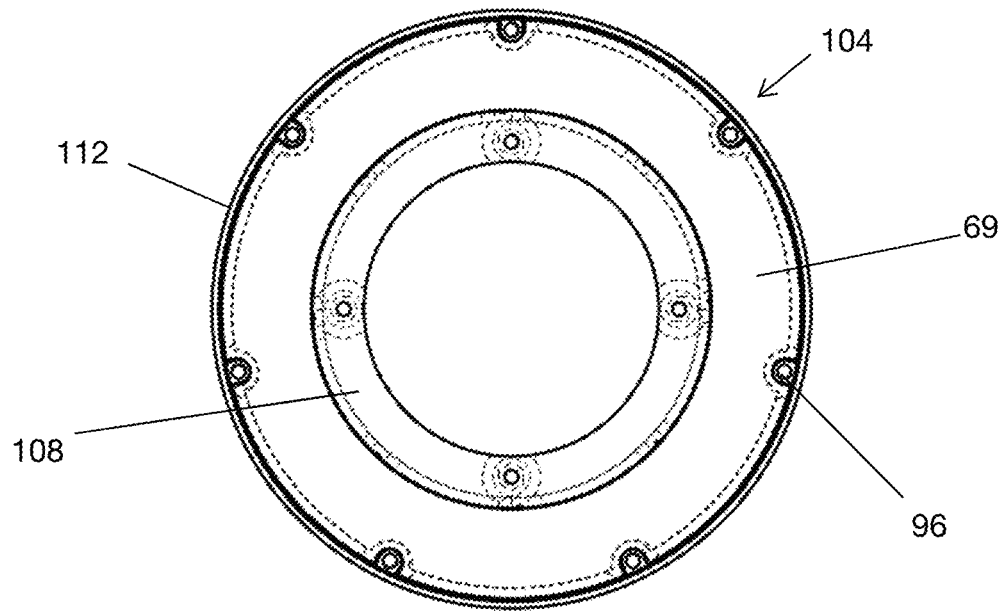
FIG. 7 is a plan view of a shroud structure according to embodiments of the invention.

A lower portion 48 of the separation chamber 46 receives the coarse dirt that is separated from the air flowing through the shroud structure 104, or that is thrown outwardly against the walls 58 of the chamber 46 as the air whirls within the chamber 46. As shown in FIGS. 3 and 4, a shroud skirt 62 is provided at a lower part of the shroud structure 104, the shroud skirt 62 extending downwardly and outwardly from the shroud structure 104 towards the surrounding chamber wall 58, so as to inhibit coarse dirt from rising from the lower portion of the chamber 48 and becoming re-entrained in the swirling air flow. As illustrated in FIG. 7, a shelf 108 extends inwardly from a lower part of the shroud structure 104, to meet an outer surface of the second dirt collector 110.

In embodiments, the screen 85 is disposed upstream of the shroud structure openings 86, radially outward of the shroud structure 104, such that the screen is attached to outward-facing surfaces of the struts 60. In such embodiments, the recesses in the struts 60 of the shroud 104 are formed on an outward-facing surface of each strut 60.

In alternative embodiments, the screen is disposed downstream of the shroud structure openings 86, radially inward of the shroud structure 104, and the screen 85 is attached to inward-facing surfaces of the struts 60. In such embodiments, the recesses in the struts of the shroud 104 are formed on an inward-facing surface of each strut 60.

In either case, in broad terms the separator assembly is made by providing a separator chamber 46 having an inlet 26 and an outlet 80, forming the shroud structure 104 within the chamber 46, the shroud structure 104 including a plurality of struts 60 spaced about the central axis, such that the shroud structure 104 defines a plurality of openings 86 between adjacent pairs of the struts 60, one or more of the struts 60 defining a recess 100. An adhesive is then provided at or within the recess 100 formed in the or each strut 60, and finally the screen 85 is attached to the shroud structure 104 by bringing the screen into contact with the adhesive provided at or within the or each recess 100.

In embodiments that include a recess 100 formed within a strut 60 of a shroud structure 104, that feature is of course applicable to separators containing only a single cyclone, or multiple cyclones configured in multiple sequential stages, for example.

In general terms, and with reference to FIG. 3, the separator assembly 16 includes an inlet through which air flows downstream from the first cyclone assembly 40 to an intermediary chamber 52. The air flow (with entrained fine dirt) enters the second cyclone assembly 42 via the inlet formed as an air flow path 50 downstream of the screen 85 or filter of the first cyclone assembly 40 (i.e. the outlet of the first cyclone assembly 40). The plurality of second cyclone separators 156 of the second cyclone assembly 42 are arranged fluidly in parallel for separating dirt from the air flow, each providing a body 176 with a cyclone inlet 160a, 160b towards an upper end and a dirt outlet 172a, 172b formed at a lower end. Each cyclone inlet 160a, 160b is arranged substantially tangentially with respect to the body 176 of its respective cyclone, so that air and entrained dirt forms a whirling flow path within the cyclone body 176.

The assembly includes an upper sealing plate 78 forming an end wall of each of the second cyclone separators 156. The intermediary volume 52 is formed between the upper sealing plate 78 and a lower sealing plate 66. Air and dirt is drawn into the inlets 160a, 160b of the second cyclone separators 156 from the intermediary volume 52. Each of the second cyclone separators 156 extends through a respective opening 130, 132 defined in the lower sealing plate 66 (illustrated in more detail in FIGS. 10 and 11), such that the dirt outlets 172a, 172b of the second cyclone separators 156 lie below the sealing plate 66.

The second dirt collector 110, mentioned previously, lies generally below the second cyclone separators 156, and is bounded at its upper end by the lower sealing plate 66.

Figure 14:
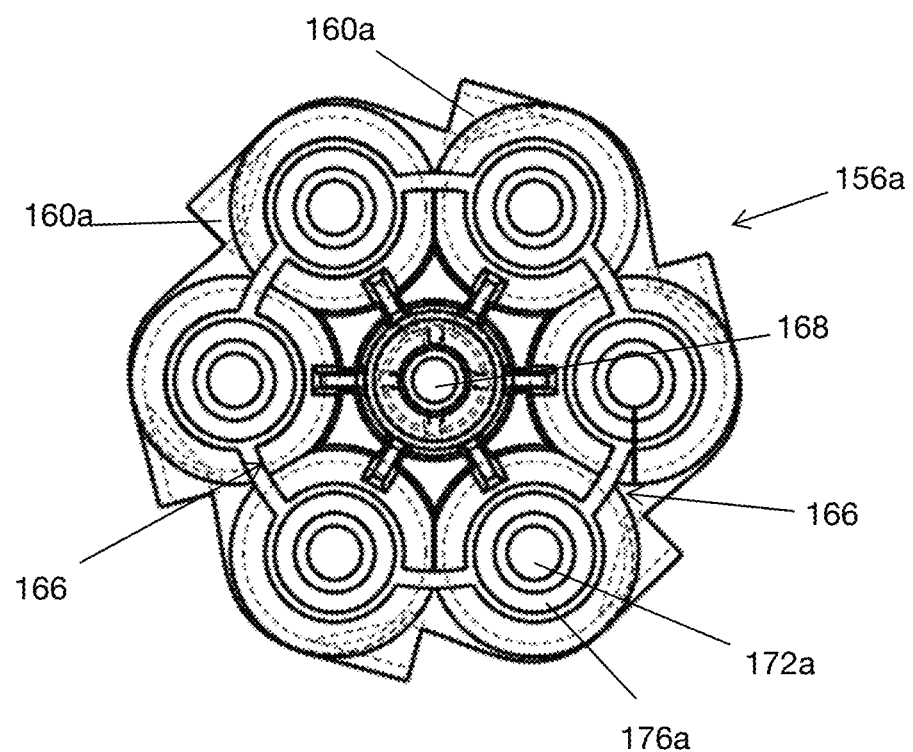
FIG. 14 is a plan view of a first set of second cyclone separators, according to embodiments of the invention.
Figure 15:
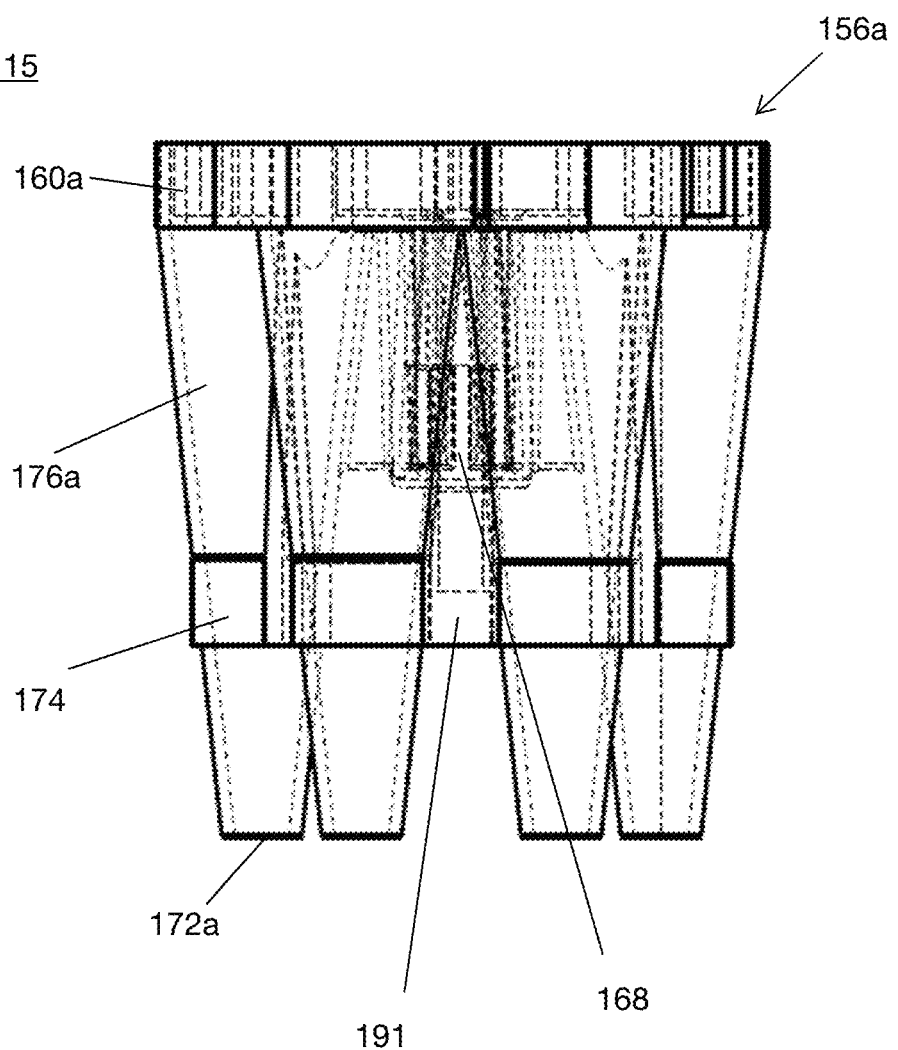
FIG. 15 is a side view of the first set of second cyclone separators of FIG. 14.
Figure 16:
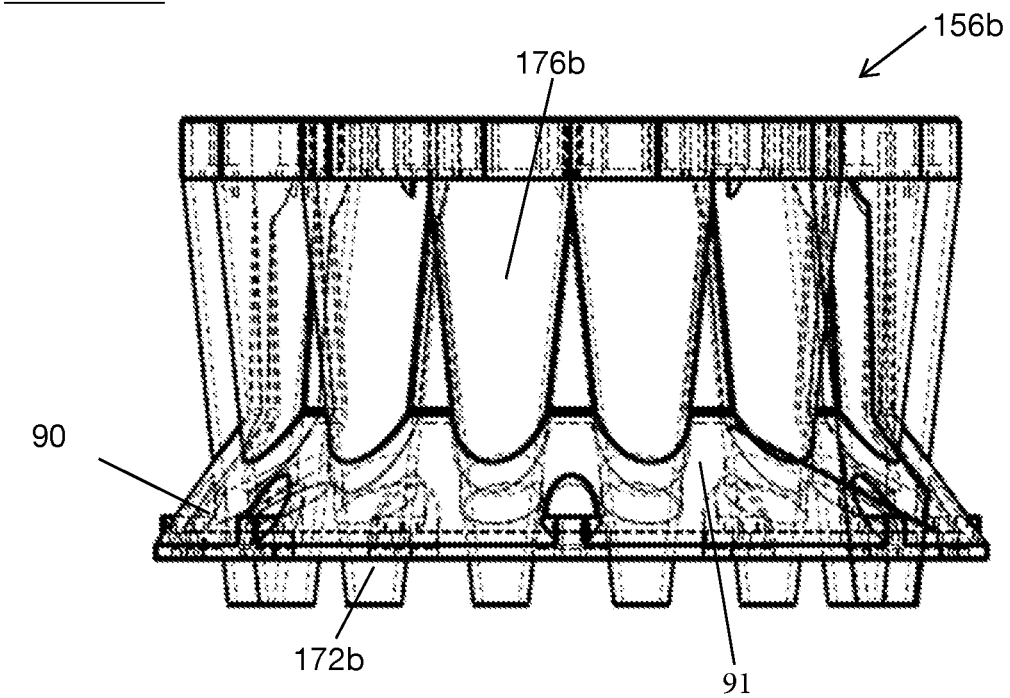
FIG. 16 is a side view of a second set of second cyclone separators according to embodiments of the invention.

In embodiments, and as shown (in FIG. 20, for example), the second cyclone assembly 42 comprises a first set of cyclone separators 156a and a second set of cyclone separators 156b, the cyclone separators of each set being arranged about a central axis A, and the cyclone separators of the first set 156a being spaced radially from the central axis A by a first distance (D1), and the cyclone separators of the second set 156b are spaced radially from the central axis A by a second distance (D2) that is greater than the first distance (D1). In other words, the first set of cyclone separators 156a is formed in a first ring, centred about the central axis A, and the second set of cyclone separators 156b is formed in a second ring that is larger than the first ring. In this way, the second ring lies around the first ring. In embodiments, and as shown, the rings may be concentric, and the first ring may lie directly within the second ring. Each ring may include a different number of cyclones. As shown, the outer (i.e. second) ring may include fourteen cyclones and the inner ring may include five cyclones. In other embodiments, the inner ring may include six cyclones (as shown in FIGS. 14 and 15, for example). The outer ring may include between seven and twenty cyclones, and the inner ring may include between three and ten cyclones.

In embodiments, the bodies 176a of the first set and second set of cyclone separators 156a, 156b are spaced apart radially from the central axis A, such that a portion of the intermediary volume 52 lies between the respective cyclone inlets 160a, 160b of the first set and second set of cyclone separators 156a, 156b. In this way, the intermediary volume 52 forms a shared volume from which inlets of each set of second cyclone separators 156a, 156b draw air on the air flow path.

Figure 17:
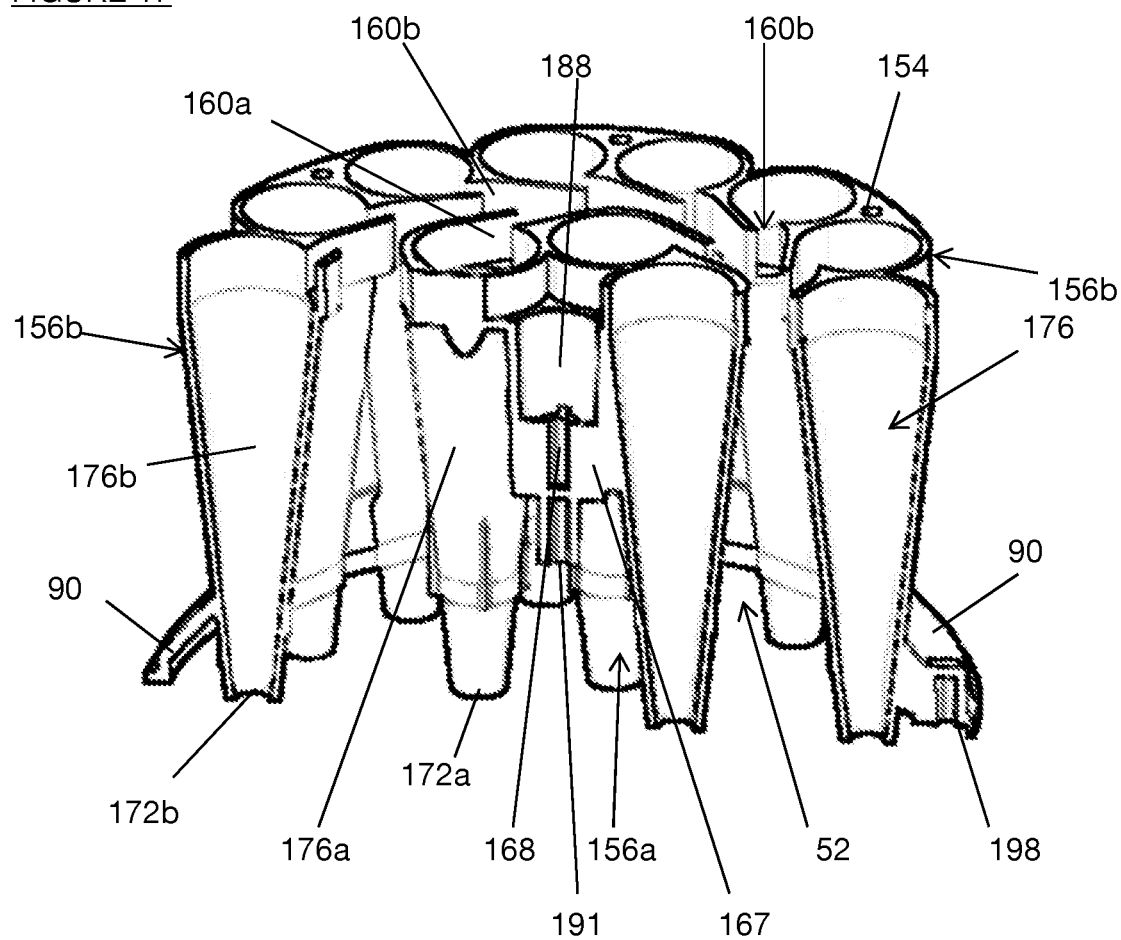
FIG. 17 is a perspective sliced view of second cyclone separators according to embodiments of the invention.

As can be seen in FIG. 17, the inlets 160a of the first set of cyclones 156a are positioned on the outside of the ring, i.e. facing generally outwardly, and the inlets 160b of the second set of cyclones 156b are positioned on the inside of the ring, i.e. facing generally inwardly, so that the inlets of the first and second sets 160a, 160b are disposed adjacent each other (in the radial direction from the central axis), within the intermediary volume 52. For each set of cyclones 156a, 156b, the inlets 160a, 160b of the cyclones in that set all open in the same rotational direction into the respective bodies 176a, 176b of the cyclones—so that fluid entering each cyclone via its inlet 160a, 160b swirls in the same rotational direction as the other cyclones in that set (i.e. either clockwise or anticlockwise). The inlets 160a of the first set 156a open in the opposite direction to the inlets 160b of the second set 156b. In this way, as air and entrained dirt swirls around the intermediary volume, the air and dirt is drawn into the inlets 160a, 160b in the same general direction, so that on the innermost ring (i.e. the first set of cyclones 156a) the air is drawn through the inlet 160a on the outer side of the ring, and on the outer ring (i.e. the second set of cyclones 156b) the air is drawn through the inlet 160b on the inside of the ring.

In embodiments, the body 176a, 176b of at least one of the cyclone separators provides a seating member 174 that extends radially outwards from its body 176a, 176b, configured to abut an upper surface 136 of the lower sealing plate 66. The seating member 174 comprises a fin, that lies generally lengthwise of the body 176a, 176b of the cyclone separator, and provides an abutment surface configured to lie against the upper surface 136 of the lower sealing plate 66 as the body 176a, 176b is seated in its respective aperture 130, 132 in the plate. In alternative embodiments, the seating member(s) may be provided by any other suitable protruding part, such as a shelf disposed around the perimeter of the body, for example.

It is important that the bodies 176a, 176b seal against the edges of their respective openings 130, 132 defined in the lower sealing plate 66. Due to the tapering shape of the lower ends of the bodies 176a, 176b, it is important that each body sits at the correct height relative to the lower sealing plate 66, to prevent the cyclone bodies 176a, 176b being inserted further downwards relative to the lower sealing plate 66 as the parts of the separator are assembled. This in turn ensures that the diameter of each body 176a, 176b as it sits within the opening 130, 132 defined in the lower sealing plate 66, matches the diameter of the opening 130, 132. In embodiments, and as depicted in the Figures, each of the first set of cyclone separators 156a provides a seating member 174.

In embodiments, the first set of cyclone separators 156a is formed as a single component. The single component may be formed as single moulding. In other words, the bodies 176a of the first set of cyclone separators 156a form a continuous ring, allowing the part to be assembled and removed from the separator assembly as a single piece, thus aiding the assembly process. Adjacent cyclone bodies 176a of the first set 156a are connected via wall portions 166. In embodiments, the wall portions 166 reduce or prevent air flow from the intermediary volume 52 into the space formed between the first set of cyclones 156a.

Similarly, in embodiments, the second set of cyclone separators 156b is formed as a single component, which may be a single moulded component. Again, in embodiments, and in a similar manner to the wall portions 166 of the first set of cyclones 156a, the second set of cyclones 156b includes a second wall portion 169, for reducing or preventing air flow from the intermediary volume 52 into the space formed outside the second set of cyclones 156b.

In embodiments, and as shown in the Figures, the lower ends (and the associated dirt outlets 172a, 172b) of the second cyclone separators 156 lie in a shared plane. In other words, in use as shown—where the separator assembly is held in an upright orientation—the outlets 172a, 172b all lie in the same horizontal plane. In such embodiments, the upper ends 88 of the second cyclone separators also lie in a shared plane, since each cyclone separator body is constructed to have the same height (and other dimensions).

The separator assembly provides a second dirt collector 110, for receiving dirt separated from the air flow through the second cyclone assembly 42. The second dirt collector 110 includes a collector wall 74 defining a volume 70 for receiving dirt from the dirt outlets 172*a*, 172*b* of the second cyclone separators 156. The collector wall 74 is configured such that an upper part 68 of the collector wall 74 surrounds the lower ends of the second cyclone separators 156. In this way, the dirt outlets 172*a*, 172*b* of the second cyclone separators 156 lie within the volume 70 defined by the collector wall 74, so that dirt exiting the second cyclone separators 156 falls into that volume 70, to settle in a lower region 56 of the volume 70.

In embodiments, a portion of the upper part 68 of the collector wall 74 is shaped to match an outer contour of one or more of the second cyclone separator bodies 176*a*, 176*b*. The second cyclone separator bodies 176*a*, 176*b* are generally cylindrical, conical, or a combination of those types, and define a curved outer profile, each having a substantially circular cross-section at the point at which they pass through the lower sealing plate 66. For example, in the embodiments illustrated, the bodies 176*a*, 176*b* are part-conical, and taper towards their lower ends. The outer contour of each of the second cyclone separators 156 forms an arc of a circle, and a portion 72 of the upper part 68 of the collector wall 74 is curved to match the radius of the arc.

Figure 8:
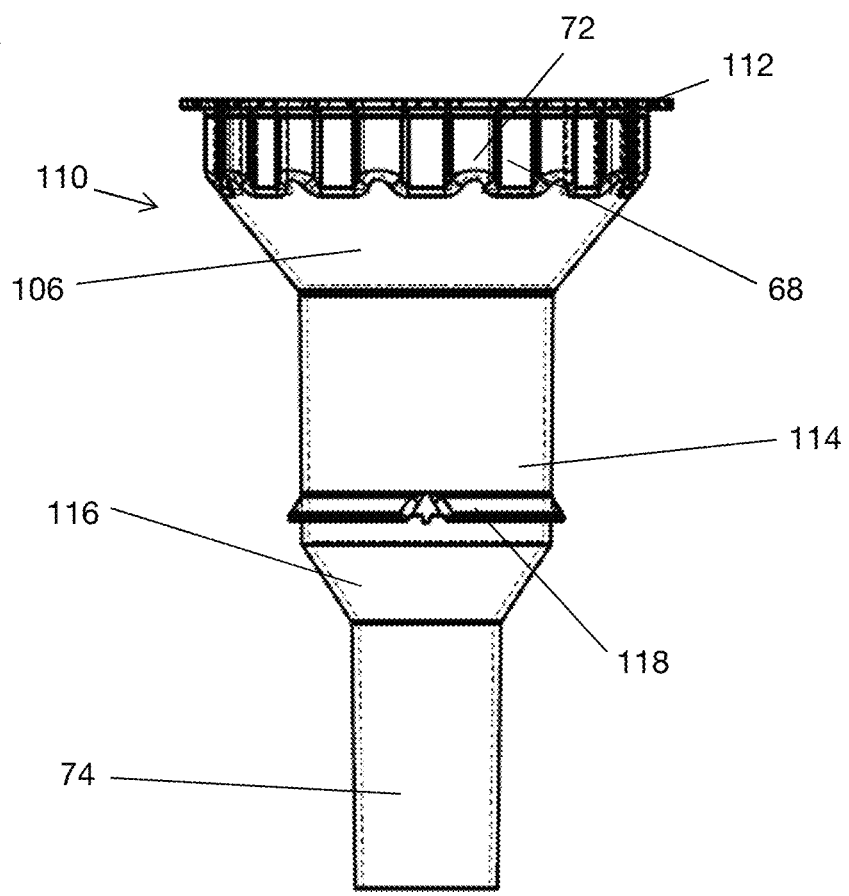
FIG. 8 is a sliced front view of a portion of a second dirt collector, according to embodiments of the invention.
Figure 21:
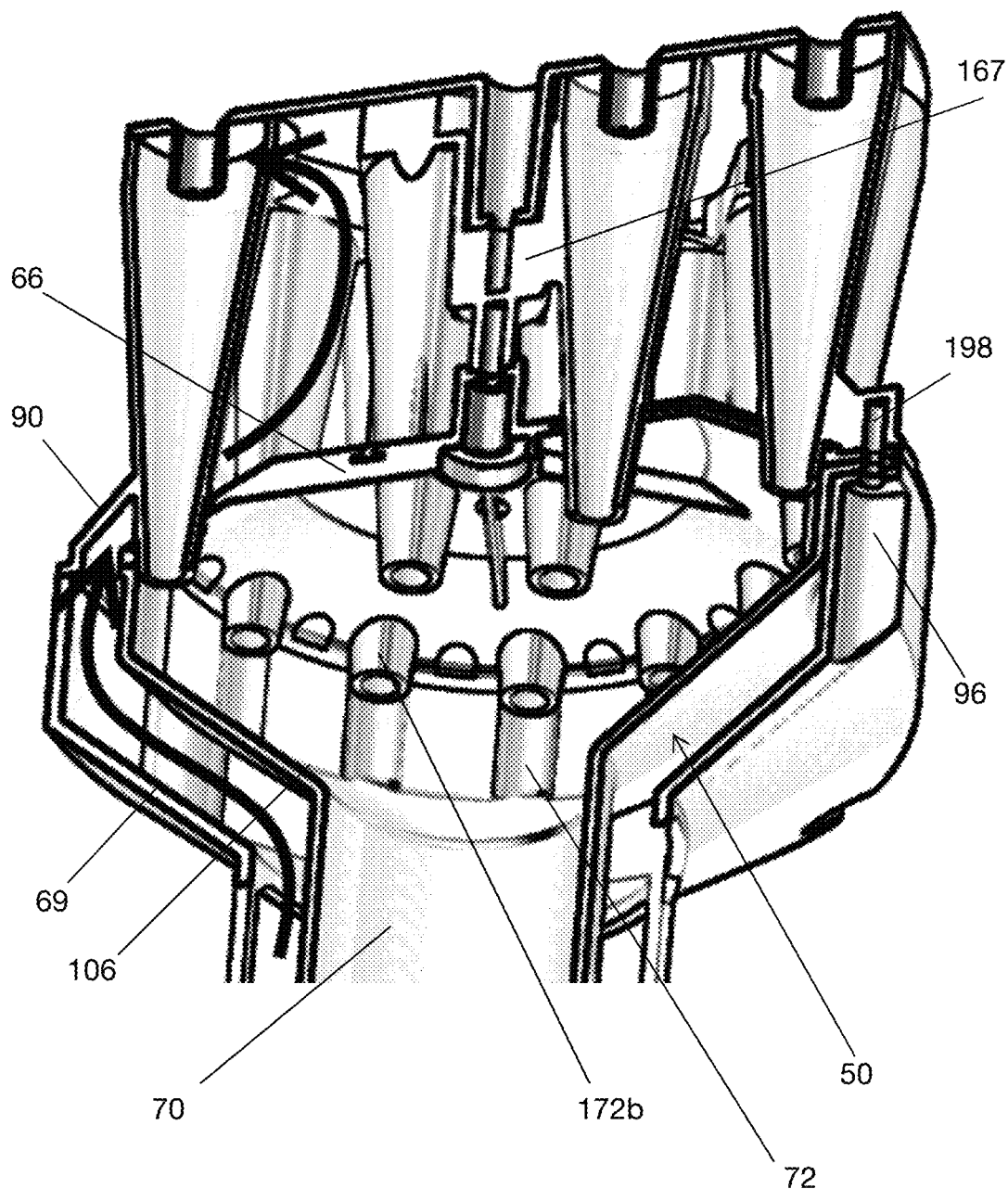
FIG. 21 is a perspective view of a sliced portion of a cyclone assembly according to embodiments of the invention.

As shown in FIGS. 3, 8 and 21, the upper part 68 of the collector wall 74 is formed in a ring surrounding the lower ends of the second cyclone separators 156. Preferably, the upper part 68 of the collector wall 74 is scalloped—in that it provides curved portions that extend further radially outwards to match the circular outer contour of the second cyclone separators 156. A tapered portion 106 joins the wide diameter upper part 68 of the collector wall 74 to the lower portions of the wall, so that dirt is channelled inwardly to the body of the second dirt collector 110. It is necessary for the central and lower regions of the collector wall 74 to have a narrow diameter relative to the upper part 68, so that the first cyclone assembly 40 can be situated around it. The tapered portion 106 of the wall 74 is preferably tapered at an angle (to the vertical) of around 30 degrees, which allows dirt to flow freely downwards to the bottom of the dirt collection volume 70, and is unlikely to settle or to be affected by cross-flow (known as 'cross talk') between the neighbouring outlets 172*a*, 172*b*.

It is advantageous to increase the cross-sectional area of the flow path, where possible without compromising the volume requirements of the suction cleaner 10 or the separator assembly 16 itself. In other words, it is an advantage for the cleaner 10 and its separator to be small, but it is also an advantage to the operation of the cleaner, for the air flow paths through the separator to be as wide as possible. Increased flow path area generally reduces the likelihood that a blockage will occur, and aids the smooth flow of air to limit pressure and suction losses.

As will be described below, the air flow path from the first cyclone assembly 40 to the second cyclone assembly 42 extends outside the second dirt collector 110, and is bounded in part by the uppermost end of the collector wall 74. Where the second cyclone separators 156 are disposed in a flat layer across the separator, it is a challenge to provide a flow path 50 that circumvents the layer of cyclones, while maximising the cross-sectional area of that flow path 50. To achieve this, the upper part 68 of the collector wall 74 has a diameter, around portions of its perimeter, that is slightly less than the diameter of the ring of second cyclone separators, so that the scalloped shape of the upper part 68 of the collector wall 74 allows the outlets 172*a*, 172*b* of the second cyclone separators to lie within the collector wall 74, while increasing the diameter of the collector wall 74 in between adjacent outlets 172*a*, 172*b*.

In embodiments, and as shown in FIG. 21, for example, the scalloped portions 72 of the upper part 68 of the collector wall 74 extend downwards from the lower sealing plate 66. In this way, dirt and fluid flowing downwardly through the outlets 172*a*, 172*b* of the second cyclones 156, may travel directly downwards as it enters the second dirt collector 110. In this way, the slowing of fluid flowing through and around the outlets 172*a*, 172*b* is reduced, and less likely to lead to dirt build-up at the outlets. Rather, dirt may continue its downward trajectory into the second dirt collector 110, towards its lower end, where the dirt may settle.

At least a portion 114 of the collector wall 74 is substantially tube-like, and in embodiments, the collector wall 74 provides a frustoconical portion 116 narrowing towards a lower end of the second dirt collector 110. With reference to FIG. 8, a shelf 118 is disposed on an outer surface of the collector wall 74, which engages with and supports a portion of the shroud structure 104. The shelf 118 may provide a friction-fit engagement to hold a portion of the shroud structure 104 securely in position relative to the second dirt collector 110, or else the shroud structure 104 may flex slightly as it is forced over the shelf 118 as the separator assembly is put together, the shelf 118 resisting disengagement between the two parts.

As described previously, the second cyclone separators 156 comprise a first set 156*a* and a second set 156*b*, the separators of each set being arranged about a central axis (note that the central axis of the second dirt collector 110 and second cyclone assembly 42 are axially aligned, and are also axially aligned with the central axis through the lower sealing plate 178). The lower sealing plate 178 provides an upper surface 136. A portion of the upper surface 136 defines an inner deflection surface 134 of the air flow path 50, inclined upwardly and radially inwardly from the outer edge of the lower sealing plate 178. In other words, the inner deflection surface 134 extends from a radially outer portion of the plate 178 towards the central axis defined through the sealing plate 178. The inner deflection surface 134 is configured to guide air on the flow path 50 upwards towards the cyclone inlets 160*a*, 160*b* of the second cyclone separators 156.

A further advantage of this configuration is that portions of the bodies 176*b* of the second set 156*b* of second cyclone separators 156 form a portion of the outer periphery of the intermediary volume 52. In this way, the bodies 176*b* of those cyclones are largely visible from the exterior of the separator, where the canister wall 58 is at least partially transparent, providing aesthetic benefits.

The cyclone separators of the first set 156*a* are spaced radially from the axis by a distance that is smaller than those of the second set 156*b*, and as a result, due to the inclined inner deflection surface 134 of the plate 178, the dirt outlets 172*a* of the first set are disposed at a position further below the sealing plate 178 than those of the second set 172*b*.

Figure 18:
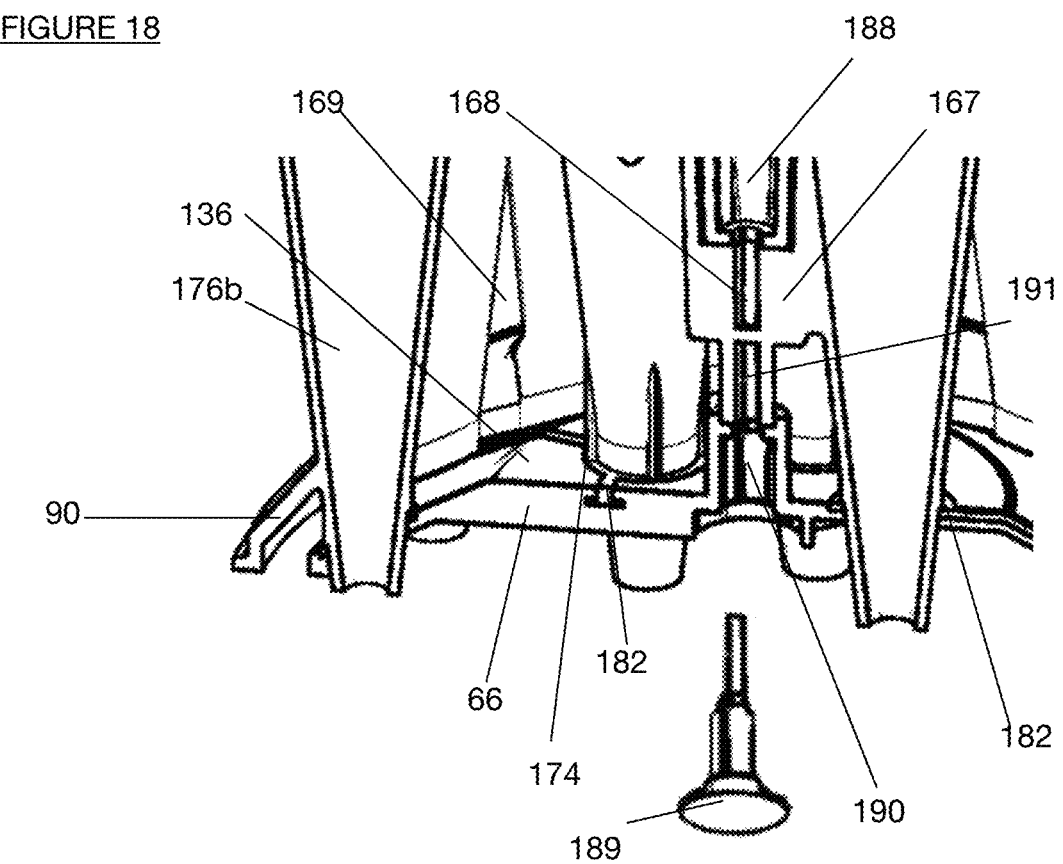
FIG. 18 is a perspective view of a sliced portion of a second cyclone assembly according to embodiments of the invention.
Figure 19:
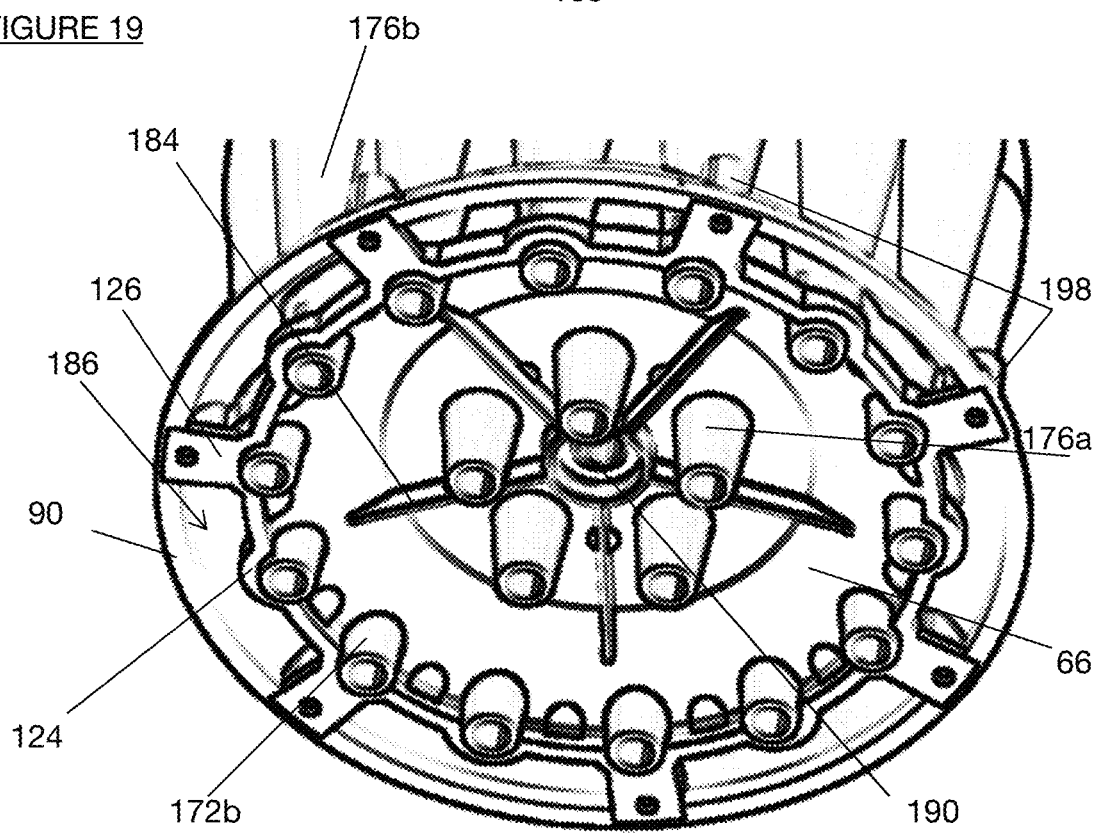
FIG. 19 is a perspective view of the underside of a second cyclone assembly according to embodiments of the invention.

As shown in FIG. 18, in embodiments a seal 182 is provided around each opening 130, 132 defined in the lower sealing plate 66. The seals 182 may be formed by overmoulding the lower sealing plate 66, to lay a separate sealing layer around the openings 130, 132. The seals 182 may be formed on a rubber or rubber-like material, to form a substantially airtight seal around the cyclones bodies 176a, 176b as the cyclones are inserted into the plate during assembly. An underside of the lower sealing plate 66 provides reinforcing ribs 184, extending radially, to provide rigidity to the plate.

In embodiments, the upper part 68 of the collector wall 74 is formed integrally with the lower sealing plate 178. In other embodiments, the lower sealing plate 178 is formed as a component that is separate from the collector wall 74. In such embodiments, the lower sealing plate 178 and collector wall 74 are secured to one another by one or more securing means, such as screws, bolts, clips, or any other suitable means.

In embodiments, and as shown in FIG. 3, for example, a lower end wall of the second dirt collector 110 (forming the volume in which dirt is received and stored) is formed by a lower wall 81 of the receptacle in which the first cyclone assembly 40 is seated. In other words, the lowermost wall 81 part of the canister containing the separator assembly may form the end wall of the second dirt collector 110, so that both the first and second dirt collectors 48, 110 share a common base, and thus can be emptied together when the lower end wall 81 is opened or removed. As shown, in embodiments, the second dirt collector is substantially surrounded by the first cyclone separator 40, and the at least a portion of the first dirt collector 48 is disposed around at least a portion of the second dirt collector 110.

We look now at the structure of the second cyclone assembly 42 in more detail, and in particular the air flow path 50 leading from the first cyclone assembly 40 to the intermediary volume 52. With reference to FIG. 21, air and entrained fine dirt that passes through the filter or screen 85 of the first cyclone assembly 40 is channelled upwards towards the intermediary volume 52, through a channel formed between the upper part 68 of the collector wall 74 of the second dirt collector 110 and an upper portion 69 of the shroud structure 104. As illustrated in FIGS. 4, 5 and 21, the upper portion 69 of the shroud structure 104 is disposed upwardly and radially outwardly from the portion of the shroud structure 104 that provides the screen 85 or filter.

The flow path 50 is also bounded by the tapered portion 106 of the second dirt collector wall 74, which diverts the air flow radially outwards so as to bypass the outlets 172a, 172b and lower ends of the second cyclone separators 156. In embodiments, and as shown, the air flow path 50 is then diverted radially inwardly at a position above the outlets 172a, 172b of the second cyclone separators 156.

At or towards a lower end of the second set 156b of second cyclone separators 156, a skirt 90 is provided. The skirt 90 is disposed radially outside the lower portions of the second cyclone separators 156.

In embodiments, the skirt 90 is formed integrally with the second set of cyclones 156b. The skirt 90 provides an outer deflection surface 91, inclined radially inwardly between a lowermost portion of the skirt and an uppermost portion of the skirt, the outer deflection surface 91 being configured to guide air on the flow path 50 radially inwards towards the inner deflection surface 134. The lowermost portion of the skirt 90 forms a round outer perimeter lying radially outwardly of the outlets 172b of the second set of cyclones 156b. The outer deflection surface 91 is angled upwardly to meet the bodies 176b of the second set of cyclones 156b at a point midway along the length (i.e. height when oriented upright) of the cyclones 156b. The skirt 90 is spaced from the inner deflection surface 134, so that at least a portion of the flow path 50 is bounded by at least a portion of the skirt 90. In other words, the skirt 90 extends downwards and outwards from the bodies 176b of the cyclones, to provide an 'upper surface' of the flow path 50 above the outlets 172b, leading to the intermediary volume 52.

The upper portion 69 of the shroud structure 104 provides a sloping portion that extends upwardly and radially outwardly, and a substantially cylindrical portion at its upper end that extends upwards to meet the skirt 90. In embodiments, the upper portion 69 of the shroud structure 104 of the first cyclone assembly 40 is secured to a portion of the skirt 90 to provide a substantially fluid-tight seal 92 between the two parts. In embodiments, a seal (such as a rubber seal) may be provided between the two parts to aid sealing. The secure connection may be made via securing formations 96, 198, comprising a pair of apertures for receiving a screw or bolt, or the like, one formed in each of the shroud structure and skirt 90, respectively. Alternative securing means may be provided, such as clips or press-fit formations, or the like. The skirt 90 may include recessed portions 94 adjacent the securing formations 198 to enable a screw or the like to be inserted.

Figure 9:
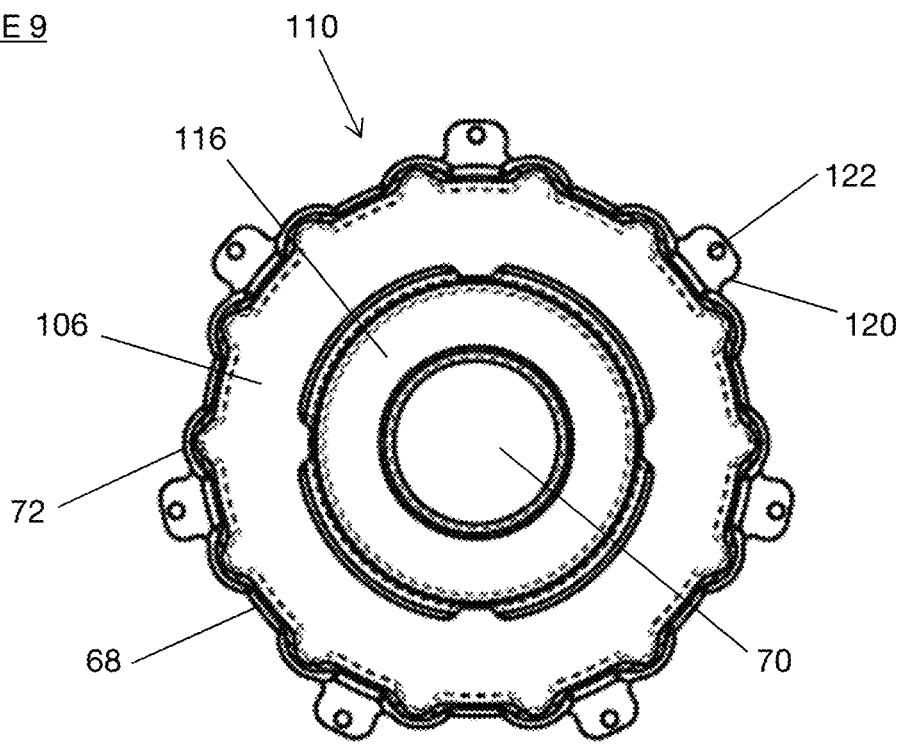
FIG. 9 is a plan view of the second dirt collector of FIG. 8.
Figure 10:
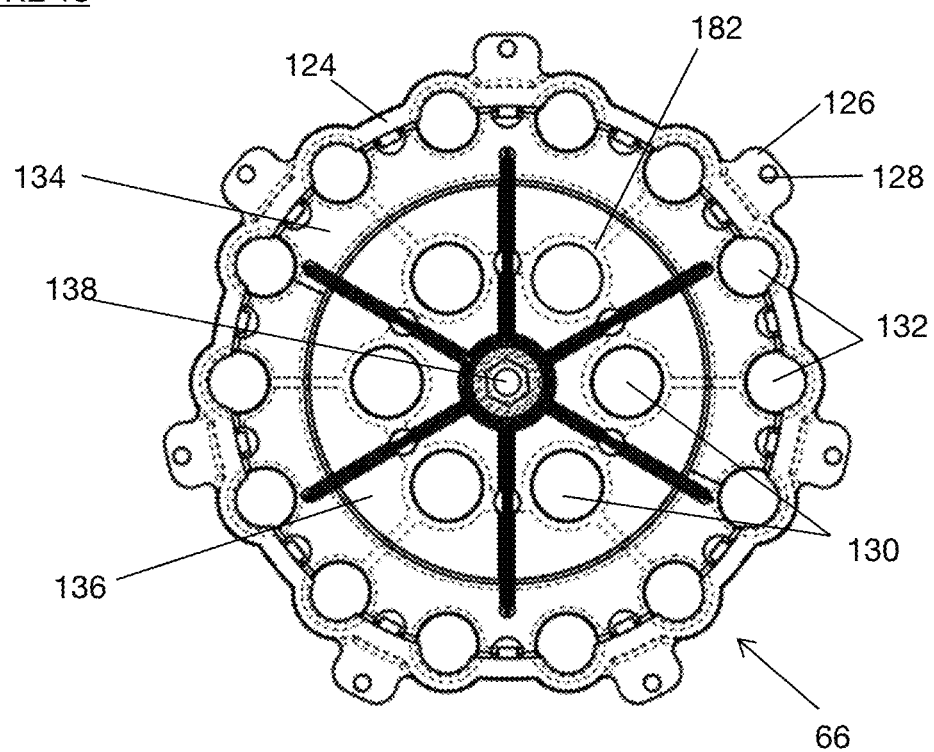
FIG. 10 is a view of the underside of a lower sealing plate according to embodiments of the invention.
Figure 11:
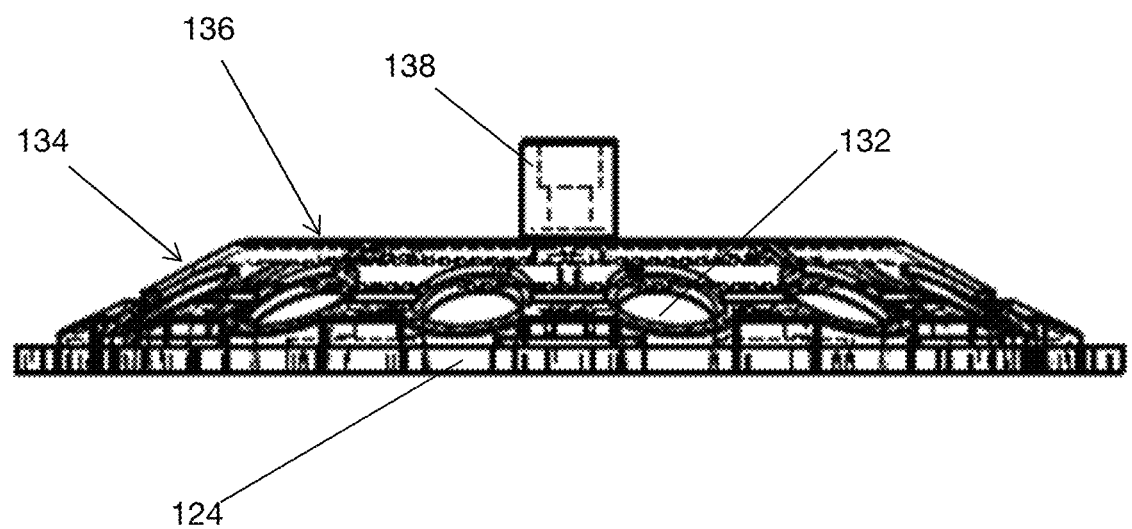
FIG. 11 is a side view of the lower sealing plate of FIG. 10.

In embodiments, and as shown in FIGS. 9 and 10, the uppermost end dirt collector wall 74 of the second dirt collector 110 provides an outer rim 112. The rim 112 provides one or more tabs 120, extending radially outward, each defining an aperture 122 for receiving the screw or bolt inserted through the securing formations of the skirt 90 and shroud structure 104. The lower sealing plate 66 provides one or more corresponding tabs 126, extending radially outward from the perimeter 124 of the plate, each defining an aperture 128 for receiving the screw or bolt inserted through the securing formations of the skirt 90 and shroud structure 104. In other words, the tabs 120, 126 are disposed between the securing formations 96, 198, so that as the screw or bolt is inserted, it passes through the apertures 122, 128, defined by the tabs 120, 126, thus holding the lower sealing plate 66 and second dirt collector 110 securely relative to the shroud structure 104 and skirt 90. Tabs 120, 126 extend across portions of the air flow path 50, and apertures 186 between each adjacent pair of tabs 120, 126 allow air and entrained dirt to flow to the intermediary volume 52.

The entire assembly comprising the shroud structure 104, second dirt collector 110, lower sealing plate 66 and second cyclone assembly 42, is housed within the canister wall 58, and may be assembled and then positioned within the canister as a single assembly.

In embodiments, and as shown in FIGS. 17-21, a securing member 167 is formed between and securable to each of the upper sealing plate 78 and lower sealing plate 66. In general terms, the securing member 167 provides a receiving portion 168 and at least one of the upper and lower sealing plates 78, 66 provides a securing arrangement 188, 190 configured for securement to the receiving portion 168. The securing arrangement 188, 190 preferably defines an aperture, and includes a securing part 189 (such as a screw, bolt, pin, or the like) insertable through the aperture for engagement with the receiving portion 168.

In embodiments, the securing member 167 is formed integrally with one of the lower sealing plate 66 and upper sealing plate 78, and the other of the lower sealing plate 66 and upper sealing plate 78 provides the securing arrangement. In other embodiments, both the upper sealing plate 78 and lower sealing plate 66 provide a securing arrangement and the securing member is formed as a separate component. The embodiment illustrated provides the latter arrangement, in which the securing member 167 is formed as part of the first set of cyclones 156a. The securing member 167 provides a receiving portion 168 comprising an upward-facing screw-threaded recess, and a second receiving portion 191 comprising a downward-facing screw-threaded recess. Each of the upper sealing plate 78 and lower sealing plate 66 provides a respective protruding sleeve 144, 138 that extends from the plate to a distal end, in a direction towards the securing member 167. Each sleeve 144, 138 is configured to receive a securing part 189, and defines an aperture at its distal end, so that a portion of the securing part extends through the aperture to engage with its respective receiving portion 168, 191 of the securing member 167. The screw-threaded configuration of the receiving portions 168, 191, and corresponding securing parts 189, results in the upper sealing plate 78, securing member 167 and lower sealing plate 66 being drawn together as the securing parts 189 are tightened. This creates a tight fit between the parts, holding them securely to one another.

Figure 20:
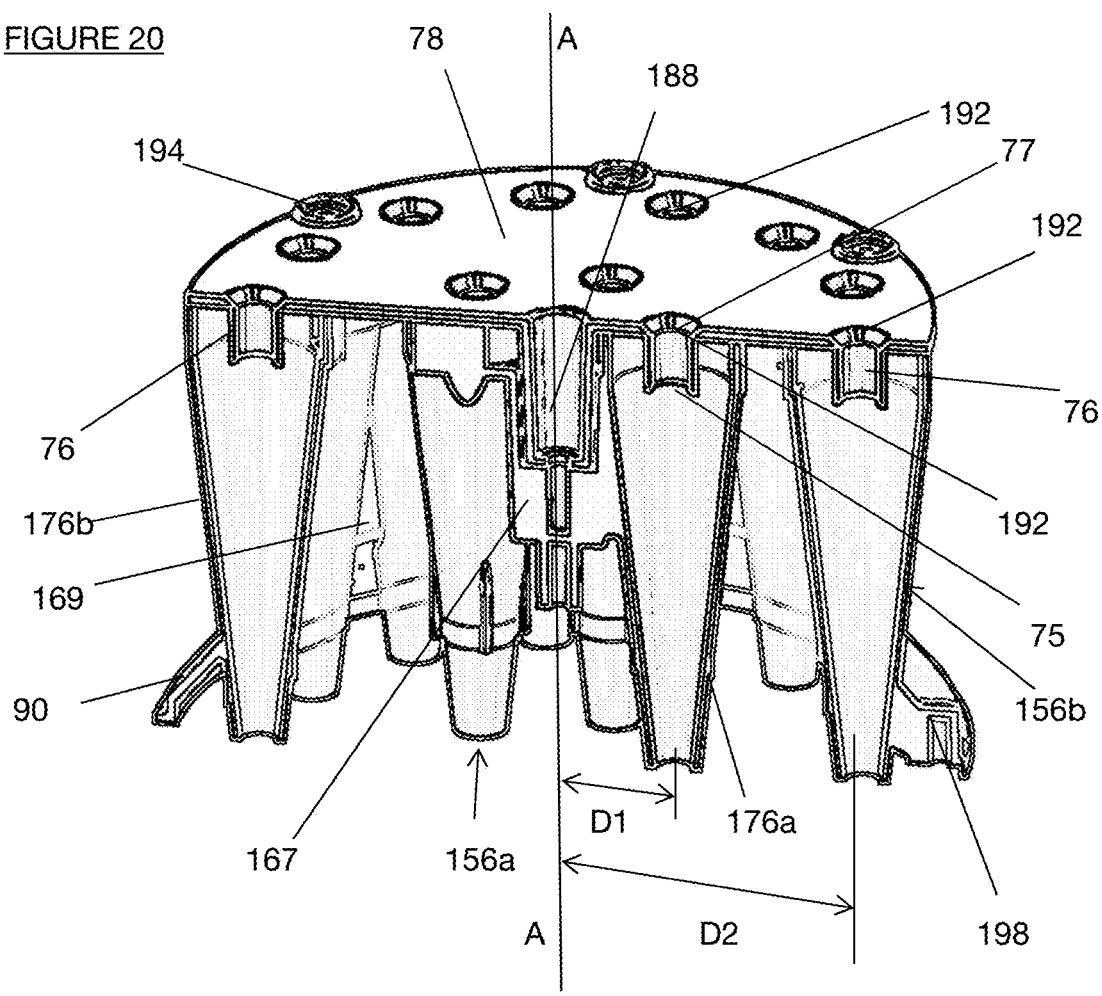
FIG. 20 is a perspective view of a sliced portion of a second stage cyclone assembly according to embodiments of the invention.

In embodiments, and as shown in FIG. 20, the securing member 167 is disposed on the central axis (i.e. the axis lying centrally through the rings of second cyclones, and centrally through the upper sealing plate 78 and lower sealing plate 66).

Turning now to the construction of the second cyclone separators 156, in embodiments, and as shown, each second cyclone is constructed with dimensions that are substantially identical. The second cyclone separators 156 are arranged fluidly in parallel for separating fine dirt from the air flow received from the intermediary volume 52.

Figure 22:
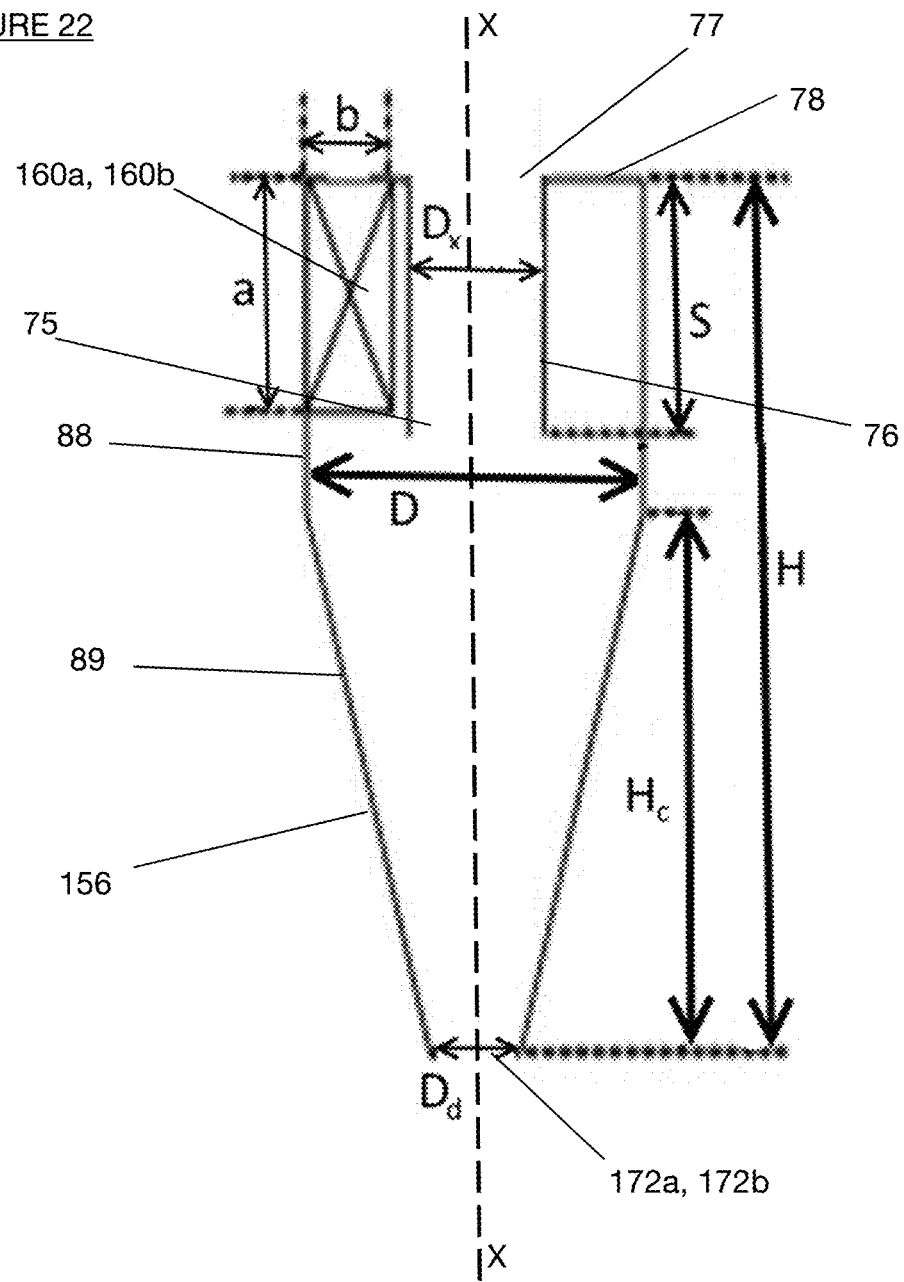
FIG. 22 is a diagrammatic representation of a cyclone separator (not drawn to scale)
Figure 23:
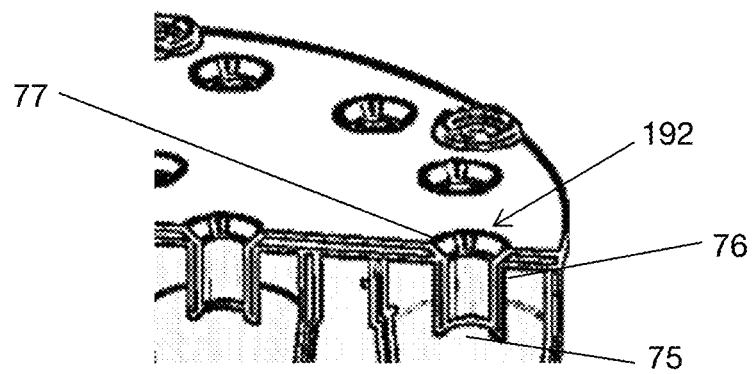
FIG. 23 is an enlarged view of a portion of FIG. 20.

With reference to FIGS. 22 and 23, each second cyclone separator provides a body 176a, 176b defining a lengthwise axis X, configured to receive from a cyclone inlet 160a, 160b towards a first end a swirling flow of air within the volume defined by the body 176a, 176b. Air and dirt swirls within the volume, from which dirt falls downwards through a dirt outlet 172a, 172b formed at a second end of the body 176a, 176b. Air is then drawn upwards through the volume towards the first end of the cyclone. An end wall is provided at the first end of the body by the upper sealing plate 78. An annular vortex finder 76 extends coaxially with the lengthwise axis X, defining a passage from a vortex finder inlet 75 disposed within the volume of the body 176a, 176b to a vortex finder outlet 77 formed in the end wall. The diameter of the passage is narrower at the vortex finder inlet 75 than at vortex finder outlet 77 (as illustrated in FIGS. 20 and 23).

In embodiments, the vortex finders 76 are provided by the upper sealing plate 78. The vortex finders 76 are preferably formed integrally with the upper sealing plate 78, to ensure that the region between the vortex finders 76 and the plate is sealed, to prevent pressure losses.

In embodiments a sealing layer is provided, configured to prevent discharge of fluid between the body 176a, 176b and the end wall of each cyclone separator. The sealing layer may comprise a rubber washer and may comprise a plate, underlying the upper sealing plate 78, held between the upper sealing plate 78 and the second cyclone bodies 176a, 176b.

In embodiments, and as shown, the passage widens in the portion of the passage adjacent the end wall. The passage in the region of the vortex finder outlet 77 preferably widens smoothly (e.g. the vortex finder outlet 77 is frustoconical). In other words, the vortex finder outlet 77 provides a chamfer 192, as can be seen in FIGS. 20 and 23. This chamfered opening is preferably formed in the upper sealing plate 78, so that the vortex finder 76 has a uniform diameter along its length from the vortex finder inlet 75 to the end wall, and subsequently widens at the chamfered outlet portion.

By widening the vortex finder passages towards their respective outlets, the effective length of the narrowed passage is reduced, which results in a reduction in associated friction losses. In addition, the speed of air leaving the vortex finder outlets 77 is reduced as the air flow is diffused, thus weakening the strength of the swirling movement of the air leaving the outlets 77, which dissipates the energy from the air stream.

Figure 12:
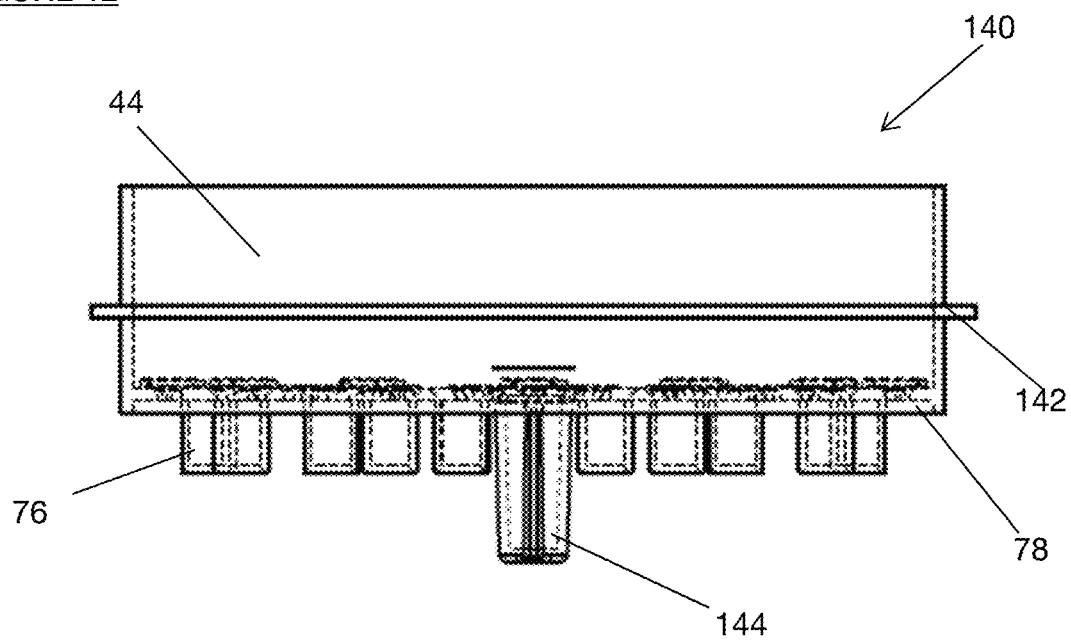
FIG. 12 is a cross-sectional side view of an outlet assembly according to embodiments of the invention.
Figure 13:
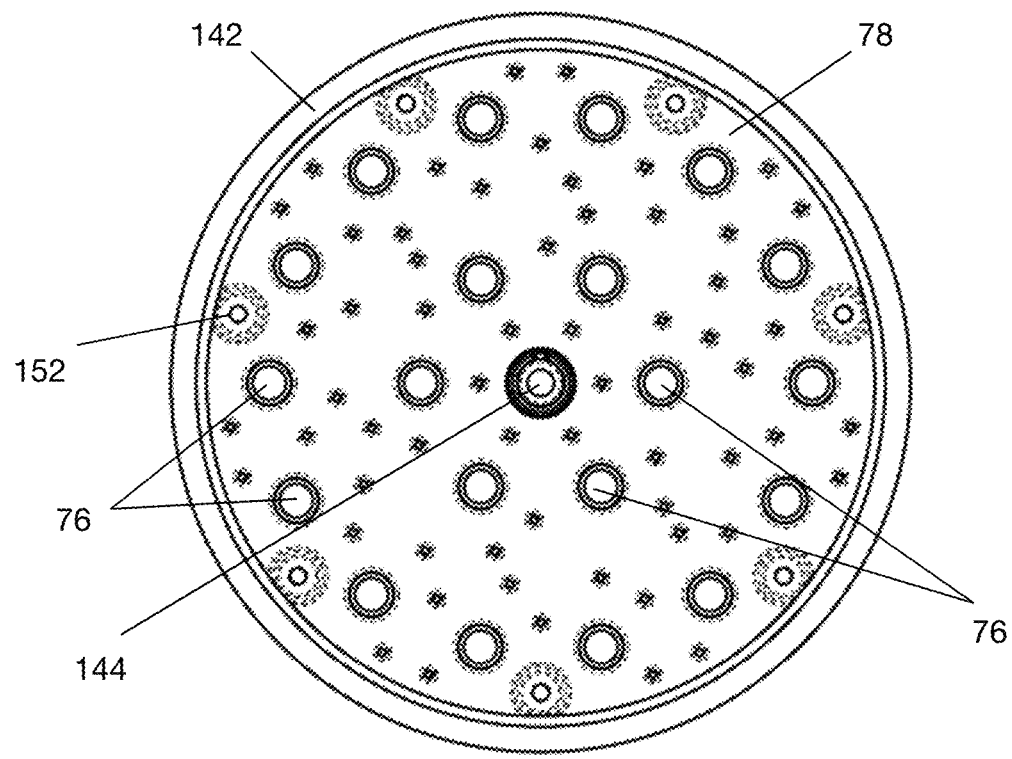
FIG. 13 is a plan view of the outlet assembly of FIG. 12, shown without a pre-motor filter.

A pre-motor filter 44 is provided immediately downstream of the vortex finder outlets 77. In embodiments, and as shown in FIG. 12, the upper sealing plate 78 and vortex finders 76 may form part of an outlet assembly 140, which lies in the air flow path between the second cyclone separators 156 and the motor 36. The outlet assembly 140 also provides a filter housing that supports the pre-motor filter 44. Preferably, the pre-motor filter 44 is supported in a position spaced from the vortex finder outlets 77. In this way, a chamber is formed downstream of the outlets 77 of the cyclone separators 156, providing a discharge volume into which air is discharged from the vortex finder outlet 77 of each cyclone. The outlet assembly 140 provides a rim 142 to assist in seating the outlet assembly in the outlet passage 80 leading to the motor 36.

The outlet assembly 140 is secured to the second cyclone separators 156 by securing means 194 (such as threaded screws, bolts, pins, or the like) inserted through plate apertures 152 defined in the upper sealing plate 78. The plate apertures 152 are positioned so that they do not coincide with any of the second cyclone separator bodies 176a, 176b lying below the upper sealing plate 78. In embodiments, and as shown, the plate apertures 152 are aligned with fixing portions 154 formed integrally with one or more of the second set of second cyclone separators 156b. Each fixing portion 154 provides a corresponding recess or aperture for receiving a portion of a securing means 194 inserted through the aperture 152. Preferably, the fixing portions 154 seal tightly against the upper sealing plate 78 to prevent fluid passing through the aligned apertures once secured.

By widening the vortex finder passages, as discussed above, the air flow leaving the vortex finders 76 is dissipated, allowing it to pass through the pre-motor filter 44 in a more uniform manner and at a lower mean velocity than would otherwise be achieved. This reduces the effect of clumping of very fine dirt that remains in the air stream following separation, in which the dirt forms in clusters on the surface of the filter. The result is that the dirt is spread more evenly, and more finely, allowing a smoother flow of air from the outlets 77 through the filter 44. This in turn reduces the pressure drop experienced across the pre-motor filter 44.

With reference again to FIG. 22 (which is not drawn to scale), the body of the cyclone has a first portion 88 at a first end that is substantially cylindrical, adjoining a second portion 89 at a second end that is substantially frustoconical. The cyclone inlet 160a, 160b is formed towards the first end, and is configured to receive a swirling flow of air within the volume, by providing an inlet passage disposed substantially tangentially to the central axis X. The dirt outlet 172a, 172b is formed at the second end. The end wall (provided by the upper sealing plate 78) closes the volume formed by the first and second portions 88, 89 at the first end, around the annular vortex finder 76 that extends coaxially with the lengthwise axis.

Of course, it should be understood that the separator assembly described herein may be constructed to different sizes, and to include different numbers of cyclone separators. As a result, the dimensions of the cyclones used in the separator may vary. However, the relative proportions of the cyclones have been found to benefit from the following constraints.

The dimensions of the second cyclone separators conform to the rule $0.3 \leq D_x/D \leq 0.42$, where D represents the diameter of the first portion 88 of the cyclone body, and $D_x$ represents the diameter of vortex finder 76. Reference to the 'diameter of the vortex finder' means the diameter of the vortex finder at its inlet 75, rather than at its wider outlet 77, where the vortex finder 76 widens along its length. The ratio of the diameter of the first portion 88 of the cyclone body D to the diameter $D_x$ of the vortex finder is important, to achieve a balance between energy losses suffered, and efficiency of the cyclone at removing dirt from the air flow. Preferably, the dimensions of the cyclone separators conform to the rule $0.304 \leq D_x/D < 0.41$, as that has been found to provide optimum balance between the two.

Another ratio of dimensions that is important is the ratio of the length S of the vortex finder within the volume and the height a of the cyclone inlet, according to the constraints $1.12 \leq S/a \leq 1.5$. Preferably, $1.12 \leq S/a \leq 1.2$. By ensuring that the vortex finder 76 extends into the volume beyond the inlet 160*a*, 160*b* by a sufficient margin, the likelihood of an air path 'short-circuiting' the cyclone by flowing directly to the vortex finder inlet 75 is reduced, and the effect of the suction through the inlet 75 on the swirling motion of the air entering the volume is minimised.

Another ratio of dimensions that is important is the ratio of the width of the cyclone inlet b, taken in the direction radially from the central axis X, against the diameter of the cyclone D at its first portion 88, according to the constraint $0.2 \leq b/D \leq 0.3$. In this range, the tangential inlet causes minimum interference with the outer wall forming the passage of the vortex finder 76. As a result, in use, the inlet air velocity may range from 20 m/s to 25 m/s, for example.

Another ratio of dimensions that is important is the ratio of the diameter of the cyclone outlet Dd against the diameter of the cyclone D at its first portion 88, constrained by the rule $0.2 \leq D_d/D \leq 0.4$. Preferably $0.28 \leq D_d/D$, to maintain separation efficiency while avoiding clogging occurring at the outlet 172*a*, 172*b*.

Another ratio of dimensions that is important is the height of the inlet relative to the height of the first portion 88 of the cyclone body 176*a*, 176*b*. The dimensions are constrained to the rule $1 \leq (H-H_c)/a \leq 1.25$, where H represents the height of the cyclone body, $H_c$ represents the height of the second portion of the cyclone body, and a represents the height of the cyclone inlet. In embodiments, $(H-H_c)/a=1$.

While preferable dimensions of the second cyclone separators 176 have been discussed above, it should be understood that the features of the separator assembly described herein may be applied to separators having cyclones with different dimensions. Furthermore, unless stated otherwise, features relating to the construction and layout of parts of the separator assembly may be applied in the context of a separator assembly including only a single stage of cyclonic separation, or in the context of any known form of suction cleaner.

It should be understood that where references to terms such as 'up', 'down', 'above', and 'below', are used, they refer to the default configuration of the device in its upright orientation in accordance with the Figures for the purpose of describing the device.

While example embodiments of the invention are described herein, it should be understood that features of different embodiments may be combined with one another, in isolation from one another or in any combination, unless stated otherwise.

When used in this specification and claims, the terms "comprises" and "including" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A separator assembly for removing dirt from an air flow in a suction cleaner, the separator assembly including:
    a first cyclone assembly including a first cyclone separator for separating coarse dirt from an air flow, the separator assembly including a filter for blocking the passage of coarse dirt from the first cyclone separator, and
    a second cyclone assembly including a plurality of second cyclone separators arranged fluidly in parallel for separating fine dirt from an air flow, each providing a body with a cyclone inlet towards an upper end and a dirt outlet formed at a lower end, at least a portion of the plurality of second cyclone separators arranged in a ring of cyclones and connected by wall portions extending laterally between adjacent second cyclone separators, the wall portions each having opposing edges that connect to adjacent secondary cyclones along a height of the secondary cyclones; and
    a sealing plate that surrounds a portion of each of the second cyclone separators, configured such that each of the second cyclone separators extends through a respective opening defined in the sealing plate so that the dirt outlets of the second cyclone separators lie below the sealing plate and the cyclone inlets lie above the sealing plate,
    wherein a flow path is defined between the filter of the first cyclone separator through which air is drawn from the first cyclone separator, to the inlets of the second cyclone separators, at least a portion of the flow path being bounded by at least a portion of an upper surface of the sealing plate and the wall portions within the ring of cyclones.

2. A separator assembly according to claim 1, wherein the upper surface of the sealing plate provides an inner deflection surface inclined upwards from an outer portion of the plate towards a central axis defined through the sealing plate, the inner deflection surface being configured to guide air on the flow path upwards towards the cyclone inlets of the second cyclone separators.

3. A separator assembly according to claim 2, wherein the second cyclone separators are arranged about the central axis.

4. A separator assembly according to claim 3, further including a skirt disposed radially outside lower portions of the second cyclone separators, the skirt being spaced from the deflection surface and at least a portion of the flow path being bounded by at least a portion of the skirt.

5. A separator assembly according to claim 4, wherein the skirt provides an outer deflection surface, inclined radially inwardly between a lowermost portion of the skirt and an uppermost portion of the skirt, the outer deflection surface being configured to guide air on the flow path radially inwards towards the inner deflection surface.

6. A separator assembly according to claim 3, wherein the second cyclone outlets lie in a shared plane.

7. A separator assembly according to claim 6, wherein the second cyclone separators comprise a first set of cyclone separators and a second set of cyclone separators, the cyclone separators of each set being arranged about the central axis, and configured such that:
the cyclone separators of the first set are spaced radially from the axis by a distance that is smaller than those of the second set, and
the dirt outlets of the first set are disposed at a position further below the sealing plate than those of the second set.

8. The separator assembly of claim 1, wherein the ring of cyclones is a first set forming an outer ring, wherein at least a portion of the plurality of second cyclone separators are a second set arranged in an inner ring of cyclones.

9. The separator assembly of claim 8, wherein the inner ring of cyclones are connected by inner wall portions, and wherein the flow path is bounded by at least a portion of the upper surface of the sealing plate, the wall portions of the first set, and the inner wall portions of the second set.

10. A suction cleaner comprising:
a suction cleaner including a suction source mounted in a cleaner body; and
a separator assembly for removing dirt from an air flow in a suction cleaner, wherein the suction source is in fluid connection with and downstream of an outlet of the separator assembly, the separator assembly including:
a first cyclone assembly including a first cyclone separator for separating coarse dirt from an air flow, the separator assembly including a filter for blocking the passage of coarse dirt from the first cyclone separator, and
a second cyclone assembly including a plurality of second cyclone separators arranged fluidly in parallel for separating fine dirt from an air flow, each providing a body with a cyclone inlet towards an upper end and a dirt outlet formed at a lower end, at least a portion of the plurality of second cyclone separators arranged in a ring of cyclones and connected by wall portions extending laterally between adjacent second cyclone separators, the wall portions each having opposing edges that connect to adjacent secondary cyclones along a height of the secondary cyclones; and
a sealing plate that surrounds a portion of each of the second cyclone separators, configured such that each of the second cyclone separators extends through a respective opening defined in the sealing plate so that the dirt outlets of the second cyclone separators lie below the sealing plate and the cyclone inlets lie above the sealing plate,
wherein a flow path is defined between the filter of the first cyclone separator through which air is drawn from the first cyclone separator, to the inlets of the second cyclone separators, at least a portion of the flow path located within the ring of cyclones being bounded by at least a portion of an upper surface of the sealing plate and the wall portions.

11. A suction cleaner according to claim 10, wherein the upper surface of the sealing plate provides an inner deflection surface inclined upwards from an outer portion of the plate towards a central axis defined through the sealing plate, the inner deflection surface being configured to guide air on the flow path upwards towards the cyclone inlets of the second cyclone separators.

12. A suction cleaner according to claim 11, wherein the second cyclone separators are arranged about the central axis.

13. A suction cleaner according to claim 12, further including a skirt disposed radially outside lower portions of the second cyclone separators, the skirt being spaced from the deflection surface and at least a portion of the flow path being bounded by at least a portion of the skirt.

14. A suction cleaner according to claim 13, wherein the skirt provides an outer deflection surface, inclined radially inwardly between a lowermost portion of the skirt and an uppermost portion of the skirt, the outer deflection surface being configured to guide air on the flow path radially inwards towards the inner deflection surface.

15. A suction cleaner according to claim 12, wherein the second cyclone outlets lie in a shared plane.

16. A suction cleaner according to claim 15, wherein the second cyclone separators comprise a first set of cyclone separators and a second set of cyclone separators, the cyclone separators of each set being arranged about the central axis, and configured such that:
the cyclone separators of the first set are spaced radially from the axis by a distance that is smaller than those of the second set, and
the dirt outlets of the first set are disposed at a position further below the sealing plate than those of the second set.

17. A suction cleaner of claim 10, wherein the ring of cyclones is a first set forming an outer ring, wherein at least a portion of the plurality of second cyclone separators are a second set arranged in an inner ring of cyclones.

18. A suction cleaner of claim 17, wherein the inner ring of cyclones are connected by inner wall portions, and wherein the flow path is bounded by at least a portion of the upper surface of the sealing plate, the wall portions of the first set, and the inner wall portions of the second set.

* * * * *